United States Patent
Vangen et al.

(10) Patent No.: US 9,856,859 B2
(45) Date of Patent: Jan. 2, 2018

(54) WIND TURBINE BLADE VIBRATION DETECTION AND RADAR CALIBRATION

(71) Applicant: VESTAS WIND SYSTEMS A/S, Aarhus N (DK)

(72) Inventors: Knut Vangen, Sandvika (NO); Erik Meum, Oslo (NO); Jan Roar Pleym, Vikhammer (NO)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 362 days.

(21) Appl. No.: 14/410,812

(22) PCT Filed: Jun. 25, 2013

(86) PCT No.: PCT/DK2013/050211
§ 371 (c)(1),
(2) Date: Dec. 23, 2014

(87) PCT Pub. No.: WO2014/000744
PCT Pub. Date: Jan. 3, 2014

(65) Prior Publication Data
US 2015/0159632 A1    Jun. 11, 2015

Related U.S. Application Data

(60) Provisional application No. 61/664,175, filed on Jun. 26, 2012.

(30) Foreign Application Priority Data

Jun. 26, 2012  (DK) .................................. 2012 70363

(51) Int. Cl.
*F03D 7/00*         (2006.01)
*F03D 17/00*       (2016.01)
(Continued)

(52) U.S. Cl.
CPC ............ *F03D 17/00* (2016.05); *F03D 1/0675* (2013.01); *F03D 7/0296* (2013.01); *F03D 7/04* (2013.01);
(Continued)

(58) Field of Classification Search
CPC ............................. F05B 2270/33; F03D 7/047
See application file for complete search history.

(56) References Cited

U.S. PATENT DOCUMENTS 4,695,736 A * 9/1987 Doman ................. F03D 7/0272
290/44
5,361,072 A * 11/1994 Barrick ..................... G01S 7/35
342/133

(Continued)

FOREIGN PATENT DOCUMENTS

DE    102006054667 A1    5/2008
EP         1981120 A1    10/2008
(Continued)

OTHER PUBLICATIONS

Danish Search Report for PA 2012 70363, dated Feb. 5, 2013.
International Search Report for PCT/DK2013/050211, dated Mar. 12, 2014.

*Primary Examiner* — Craig Kim
*Assistant Examiner* — Jason Fountain
(74) *Attorney, Agent, or Firm* — Patterson + Sheridan, LLP

(57) ABSTRACT

A wind turbine (1) is provided, having a wind turbine tower (2) and at least one rotatable blade (5), and further comprising a system for measuring rotor blade vibration of said wind turbine. The system comprises at least one Doppler radar unit (7) operatively configured to emit and receive radar signals, the radar unit being mounted on the wind turbine tower at a position above the lowest position of the at least one blade, the radar unit being positioned so as to measure (Continued)

reflections of an emitted radar signal from the turbine blade. A processing unit is configured to receive measurement data from the radar unit and to determine, by analysis of Doppler shift in received radar signals relative to transmitted signals due to movement of the blade towards or away from the turbine tower, the velocity of the blade in the direction towards or away from the turbine tower. Using a radar unit to measure blade velocity allows a determination to be made of the vibrations occurring in the blade without needing an internal sensor in the blade. This reduces manufacturing and maintenance costs of the blades since sensors in the blades will not need to be replaced, and sensors positioned on the tower are easier to replace in the field.

17 Claims, 18 Drawing Sheets

(51) Int. Cl.
*F03D 7/02* (2006.01)
*G01S 13/50* (2006.01)
*G01S 13/58* (2006.01)
*G01S 13/64* (2006.01)
*G01S 13/87* (2006.01)
*G01S 13/88* (2006.01)
*F03D 7/04* (2006.01)
*F03D 1/06* (2006.01)
*G01S 7/40* (2006.01)

(52) U.S. Cl.
CPC .......... *G01S 7/4004* (2013.01); *G01S 13/505* (2013.01); *G01S 13/582* (2013.01); *G01S 13/583* (2013.01); *G01S 13/584* (2013.01); *G01S 13/64* (2013.01); *G01S 13/87* (2013.01); *G01S 13/88* (2013.01); *F05B 2240/912* (2013.01); *F05B 2270/17* (2013.01); *F05B 2270/33* (2013.01); *F05B 2270/334* (2013.01); *F05B 2270/805* (2013.01); *G01S 13/589* (2013.01); *Y02B 10/30* (2013.01); *Y02E 10/721* (2013.01); *Y02E 10/723* (2013.01); *Y02E 10/728* (2013.01); *Y02P 70/523* (2015.11)

(56) References Cited

U.S. PATENT DOCUMENTS

| | | | |
|---|---|---|---|
| 8,120,522 B2* | 2/2012 | Tralshawala | G01N 22/02 342/118 |
| 8,319,361 B2* | 11/2012 | Lucks | F03D 7/0268 290/44 |
| 2008/0101930 A1* | 5/2008 | Bosche | F03D 7/0204 416/31 |
| 2010/0140936 A1* | 6/2010 | Benito | F03D 17/00 290/44 |
| 2011/0084486 A1* | 4/2011 | Yoneda | F03D 1/0675 290/44 |
| 2011/0090110 A1 | 4/2011 | Tralshawala et al. | |
| 2011/0175768 A1 | 7/2011 | Peczalski et al. | |
| 2011/0285578 A1 | 11/2011 | Peczalski et al. | |

FOREIGN PATENT DOCUMENTS

| | | |
|---|---|---|
| EP | 2202406 A2 | 6/2010 |
| JP | 2001116828 A | 4/2001 |
| WO | 2008/145993 A2 | 12/2008 |

* cited by examiner

WIND TURBINE BLADE VIBRATION DETECTION AND RADAR CALIBRATION

FIELD OF THE INVENTION

A first aspect of the present invention relates to a system or apparatus and corresponding method for detection of vibrations of wind turbine rotor blades.

A second aspect of the present invention relates to a method for performing diagnostics and calibration on a array antenna.

BACKGROUND OF THE INVENTION

FIG. 1 illustrates a typical wind turbine 1. The wind turbine comprises a wind turbine tower 2 on which a wind turbine nacelle 3 is mounted. A wind turbine rotor 4 comprising at least one wind turbine blade 5 is mounted on a hub 6. The hub 6 is connected to nacelle 3 through a low speed shaft (not shown) extending from the nacelle front. The wind turbine illustrated in FIG. 1 may be a small model intended for domestic or light utility usage, or may be a large model, such as those that are used in large scale electricity generation or on a wind farm for example. In the latter case, the diameter of the rotor could be as large as 100 meters or more.

In relation to a first aspect of the invention, as the wind turbine is subjected to impulses from the wind, or other weather conditions, oscillations can be established in the rotor blades, the vibrations being into and out of the plane of rotation of the rotor. It is desirable to monitor these vibrations since excessive vibration can cause damage to the blades, the rotor hub or other structural components.

Existing methods of measuring such vibrations rely on accelerometers or similar such devices mounted directly on or within the blade, or on the wind turbine hub. Such arrangements are difficult to maintain because of the difficulty in accessing the sensors, and the difficulty in providing communication paths for the sensors to return data to a central processing unit.

We have appreciated that it would be desirable to provide an alternative system and method for detecting blade vibrations.

In relation to embodiments of a second aspect of the invention, radar systems for the avoidance of collision between an aircraft and a ground-based obstacle have previously been proposed. For example, EP-A-1,486,798 describes an obstacle collision avoidance system (OCAS) that comprises a radar system that continuously scans a coverage area for moving aircraft. Upon detection of an aircraft within the coverage area, the radar is adapted to follow the aircraft as a defined target. The course, height and speed of the target are computed and if the parameters are such that there is a danger of collision of the aircraft with the obstacle, the system is activated to issue a warning signal to the pilot of the oncoming aircraft.

The OCAS system described in EP-A-1,486,798 includes one or more field units which are mounted on, or adjacent to the obstacle or obstacles of which warning is to be given. Each field unit incorporates the radar system described above and one or more warning devices for issuing warning signals to oncoming aircraft. A central processing unit processes the information from the radar system and controls the warning devices based on the processed information. In preferred embodiments, the warning device comprises a warning light that is switched on upon detection of an aircraft. In addition or as an alternative to the warning light, the field unit may comprise an audio warning device, such as a radio, for emitting audio warning signals to the pilot. The warning devices are operated in order to activate a warning in good time before a potential collision, such that the pilot has sufficient time to notice the obstacle and take evasive action to manoeuvre away from the obstacle.

Each field unit of the obstacle collision avoidance system of a wind farm is preferably equipped with a radar antenna as described in EP-A-1,486,798, which enables the desired scanning to be performed, as described above. The radar antenna preferably comprises a plurality of antenna panels mounted on a framework such that the panels face outwards from the framework in different directions. Particularly preferably, the antenna panels are arranged as the sides of an octagon.

Each antenna panel comprises a plurality of antenna elements which are selected according to frequency, vertical coverage requirements etc. With the arrangement of antenna panels described above, the antenna elements form an array that extends along both a horizontal (azimuth) axis and a vertical (elevation) axis to provide the desired coverage of the radar. A suitable radar antenna arrangement for use in the field units of the present invention is described in WO-A-2011/085237.

We have appreciated that it would be desirable to be able to perform diagnostic checks on an array radar system such as the sort used in the OCAS arrangement.

SUMMARY OF THE INVENTION

A first aspect of the invention is defined in independent claims 1 and 16, to which reference is now directed. Preferred features are set out in the dependent claims.

Embodiments of the first aspect of the invention may provide a wind turbine, having a wind turbine tower and at least one rotatable blade, and further comprising a system for measuring rotor blade vibration of said wind turbine. The system comprises at least one Doppler radar unit operatively configured to emit and receive radar signals, the radar unit being mounted on the wind turbine tower at a position above the lowest position of the at least one blade, the radar unit being positioned so as to measure reflections of an emitted radar signal from the turbine blade. A processing unit is configured to receive measurement data from the radar unit and to determine, by analysis of Doppler shift in received radar signals relative to transmitted signals due to movement of the blade towards or away from the turbine tower, the velocity of the blade in the direction towards or away from the turbine tower. Using a radar unit to measure blade velocity allows a determination to be made of the vibrations occurring in the blade without needing an internal sensor in the blade. This reduces manufacturing and maintenance costs of the blades since sensors in the blades will not need to be replaced, and sensors positioned on the tower are easier to replace in the field.

Preferably the radar unit is a frequency modulated continuous wave (FMCW) radar unit having a frequency modulation period $t_1$ of duration such that the rotor blade, when passing through the radar beam, is within said beam for the duration of at least two frequency modulation periods. FMCW radar units allow a continually transmitting beam using reliable cost effective components. Configuring the frequency modulation period to allow at least two frequency scans of the passing blade allows determination of Doppler shift due to relative movement of the blade to be obtained by comparison of Doppler shifts between scans. The frequency modulation period may, for example, be between 0.5 and 0.01 milliseconds, and more specifically between 0.2 and 0.05 milliseconds.

The processing unit may then be configured to process the measured data from the radar unit obtained during a first frequency modulation period and subsequent frequency modulation period to determine the Doppler shift due to movement of the blade towards or away from the turbine tower. In particular, the radar unit may measure a frequency response, and the processing unit is configured to process the frequency responses obtained for the first and subsequent frequency modulations to determine respective range profiles indicative of the range from the radar unit to the blade; process the range profiles to obtain respective Doppler information; and to compare the Doppler information to determine the velocity of the blade in the direction towards or away from the turbine tower.

The range profiles may include a plurality of range "bins", each corresponding to a set or spread of ranges, the processing unit being configured to process the frequency components falling into the range bins corresponding to the position of the blade to obtain respective Doppler information relevant to the blade and not to other objects found at differing locations. Processing only those frequencies relevant to the blade, or to objects detected at the range of the blade, avoids unnecessary processing of unrelated detected objects.

Preferably the processing unit is configured to determine the velocity of the tower side (or suction side) and the opposite side (the pressure side) of the blade by identifying signals/reflections received from the respective blade sides. The processing unit may process the range profiles to obtain respective Doppler information for both the tower side and opposite side of the blade and compare the Doppler information for both blade sides to determine the velocity of each side of the blade in the direction towards or away from the turbine tower. Detecting the velocities of both major surfaces of the blade allows a comparison to be made to determine whether the structure of the blade itself is varying, this being the case if the velocity of one side is different to the velocity of the other.

Preferably the radar unit is mounted in a position such that the radar signal reflects from the blade tip when passing through the lowest point in its rotation. Monitoring the blade tip, or a portion of the blade in the vicinity thereof, rather than further towards the root of the blade allows the most likely point of greatest deflection due to vibration to be measured.

A plurality of Doppler radar units may be used, each mounted on the turbine tower. A plurality of Doppler radar units may be arranged around the circumference of the wind turbine tower at a common height. Distributing radar units around the circumference allows readings to be taken at any yaw position. A plurality of Doppler radar units may alternatively or additionally be arranged linearly along the length of the tower between the centre of rotation of the blade and the lowest position of the blade, allowing for measurements of blade velocity at a plurality of points along the blade length to build up a velocity profile for the entire blade.

Rather than providing a plurality of Doppler radar units around the circumference of the tower, a radar unit may be rotatably mounted on the tower such that it may rotate around the axis of the tower, the radar unit further comprising a rotation controller for controlling the rotational position of the radar unit about the axis of the tower. Preferably, a yaw control system for rotating the nacelle of the wind turbine, and the blade, about the axis of the tower to yaw the blade/rotor may be provided. The rotation controller may be coupled to the yaw control system with the rotation controller being operable to receive yaw data indicative of the yaw position of the wind turbine and to control the rotational position of the radar unit to position it to face substantially perpendicular to the plane of rotation of the rotor blade in response to the yaw data. By controlling the circumferential position of the radar unit to match the yaw angle of the wind turbine the radar unit can receive data to calculate velocity of the blade at any yaw angle.

The processing unit may be configured to issue a shut down signal to shut down the wind turbine when the detected velocity of the blade in the direction towards or away from the turbine tower exceeds a predetermined value.

The radar unit may comprise a plurality of elements of the sort described in relation to a second aspect of the invention. The radar unit then may comprise a phased array.

A corresponding method may be provided for measuring rotor blade vibration in a wind turbine comprising a wind turbine tower and at least one rotatable blade. The method comprises providing at least one Doppler radar unit operatively configured to emit and receive a radar signal mounted on the wind turbine tower at a position above the lowest position of the at least one blade, the radar unit being positioned so as to measure reflections of an emitted radar signal from the turbine blade. Radar signals are emitted and reflections received from the blade. The method further includes analysing the Doppler shift of the received radar signals relative to transmitted signals to determine the velocity of movement of the blade towards or away from the turbine tower.

A second aspect of the invention is defined in independent claims 18 and 38, to which reference is now directed. Preferred features are set out in the dependent claims.

Embodiments of the second aspect of the invention may provide a method for calibrating a radar system comprising a plurality of antenna elements arranged in an array, each element comprising a transmitter and receiver for transmitting and receiving signals, the antenna elements being operable to function in a transmit mode or a receive mode and to adjust amplitude and phase of the signal. The method comprises activating the transmit mode in a first antenna element of the array to transmit a signal and activating the receive mode in a second antenna element of the array proximate to the first antenna element, the second antenna element being selected to be positioned so as to receive radiation originating from a side lobe of the first antenna element. A determination is then made as to whether the second antenna element receives the signal, being a signal from the first radar element.

Preferably, the receive mode is activated in at least one further antenna element of the array, proximate to the first antenna element, such that the second antenna element and each of the further antenna elements operate in receive mode while the first radar element operates in transmit mode. The method may then include the step of determining the relative phase and/or amplitude of the second antenna element and each of the further antenna elements. Preferably the method further comprises selecting the second antenna element and each of the further antenna elements to be activated in receive mode, the second element and each further element being selected such that they are located in a position relative to the first antenna element such that the expected signal from the first antenna element at the position of the second and further elements is equivalent. Preferably the second element and each of the further elements are selected such that they are located in positions in which they may receive equivalent side lobe radiation from the first radar element. The second element and each further element may be located on different sides of the first element, and equidistant therefrom. The second element and each one of the further elements may be located symmetrically or mirrored about an axis through the first element.

The array preferably comprises a plurality of sub-array panels arranged to form a three dimensional structure out from which the elements radiate. Each panel has a plurality of elements thereon, with the first antenna element is located on a different panel than the second and further antenna elements. The second antenna element and the one or more further antenna elements are preferably located on a common panel. The first radar element is preferably diagonally located from the second antenna element and the one or more further antenna elements in the array.

In other embodiments, rather than relying on a single emitter and two or more receivers, the method may comprise activating the transmit mode in at least one further antenna element of the array, proximate to the second antenna element, such that the first antenna element and each of the further radar elements operate in transmit mode while the second radar element operates in receive mode. The method then further includes determining the relative phase and/or gain/amplitude of the second antenna element and each of the further antenna elements in a similar manner as before. The method preferably further comprises selecting the second antenna element and each of the further antenna elements to be activated in transmit mode, the first element and each further element being selected such that they are located in a position relative to the second radar element such that the expected signal from the first antenna element and the further radar elements at the position of the second radar element is equivalent. The first antenna element and each of the further elements are preferably selected such that they are located in a position in which they may transmit radiation from the equivalent side lobes to the second radar element. The first element and each further element are preferably located on different sides of the second element, and equidistant therefrom. The first element and each one of the further elements are preferably located symmetrically about or mirrored about an axis through the second element. As mentioned above, the array may comprise a plurality of panels, each having a plurality of elements thereon. Preferably the first antenna element and the one or more further antenna elements are located on a common panel, and the first antenna element and the second antenna element are located on different panels. Preferably the second antenna element is diagonally located from the first antenna element and the one or more further antenna elements on the array. Alternatively, the first antenna element is operated in the receive mode, and the transmit mode is activated in the second and at least one further antenna elements.

The method preferably further includes the step of adjusting the phase or amplitude/gain setting of the second and/or each of the further antenna elements in response to the determined relative phase or amplitude/gain measurement.

Where the embodiments of the first aspect of the invention comprise a radar system having a phased array of elements, the methods described in relation to the second aspect of the invention may be used therewith to check and calibrate such an array.

Embodiments of the second aspect of the invention may also provide a system or apparatus comprising a radar system comprising a plurality of antenna elements arranged in an array, each element comprising a radar transmitter and receiver for transmitting and receiving radar signals, the antenna elements being operable to function in a transmit mode or a receive mode. A control unit is also provided, being coupled to the radar system, the control unit being configured to activate the transmit mode in a first antenna element of the array to transmit a radar signal and to activate the receive mode in a second antenna element of the array proximate to the first antenna element, and positioned so as to receive radiation originating from a side lobe of the first antenna element. The control unit is further configured to determine whether the second antenna element receives a radar signal. The control unit may be further configured to undertake any of the methods described above or below. A corresponding computer program that when run on the system according causes the control unit to undertake the methods described above or below may also be provided.

BRIEF DESCRIPTION OF THE DRAWINGS

Examples of the invention will now be described in more detail with reference to the drawings in which.

DETAILED DESCRIPTION OF PREFERRED EMBODIMENTS

Embodiments according to a first aspect of the present invention will now be described.

Figure 1:
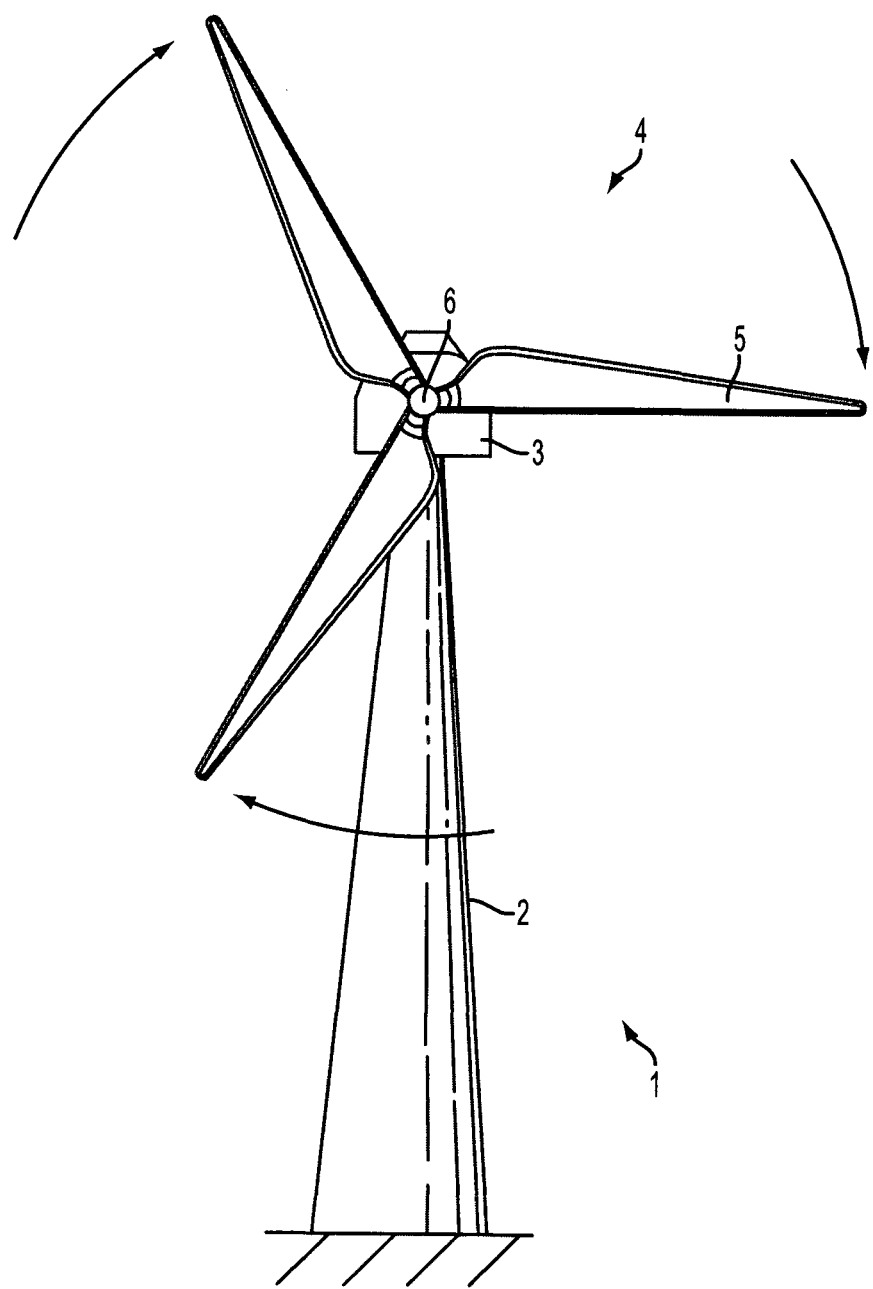
FIG. 1 is a schematic illustration of a wind turbine.
Figure 2:
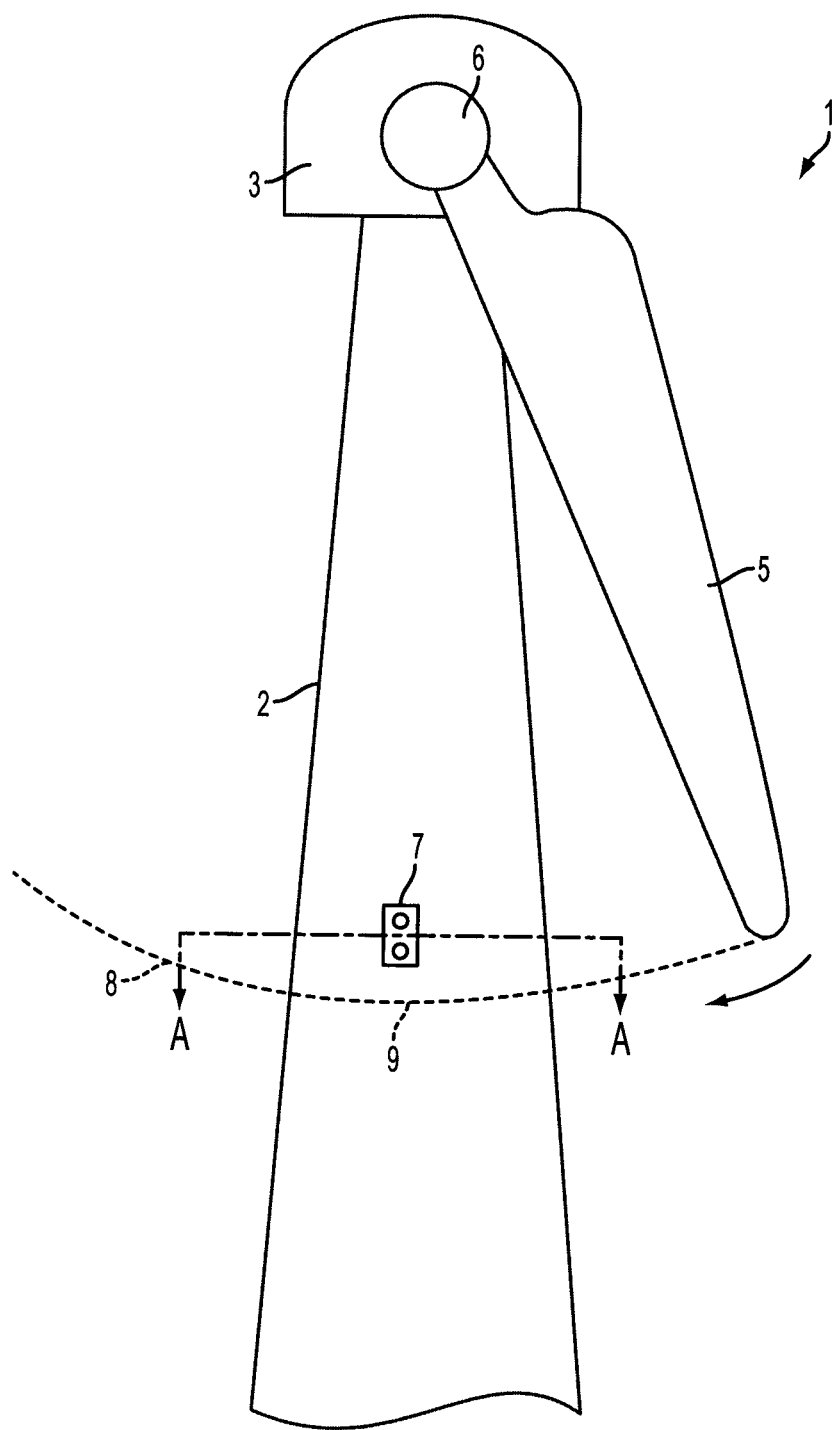
FIG. 2 is a schematic illustration of a wind turbine including a radar unit in accordance with an embodiment of the first aspect of the invention.

FIG. 2 shows a schematic illustration of a wind turbine incorporating a radar unit 7. The wind turbine is shown as having only a single blade for illustration purposes only. It will be appreciated that a wind turbine will usually have more blades, and typically will have three blades. As wind is incident on the blade it causes a rotation in the direction indicated by the arrow in the figure. The blade traces out a circular path 8 and reaches its lowest point 9 relative to the base of the turbine when the major or lengthwise axis of the blade is vertical; that is, the blade reaches its lowest point in its rotation when its major axis coincides with the main/vertical axis of the tower 2.

Fixed to the tower is a radar unit comprising an emitter and receiver. The radar unit is positioned above the lowest point 9 at which the blade 5 passes such that radar signals emitted from the radar unit reflect from the blade and are detected by the receiver. The emitter and receiver may be the same component, but in certain embodiments are preferably separated in space to avoid interference.

A processing unit may be provided, coupled to the radar unit to receive data therefrom. Vibrations cause the blade to move towards or away from the tower as the blade rotates. The processing unit determines the Doppler shift of the return radar signal from the blade as it vibrates, based on received data from the radar unit, to determine the velocity of the blade towards, or away from, the tower. There are several ways of producing the Doppler effect using a radar device. Radars may be coherent pulsed (CP), pulse-Doppler radar, continuous wave (CW), or frequency modulated (FM). CW Doppler radar only provides a speed output, as the received signal from the target is compared in frequency with the original signal, but there is no temporal signal with which to extract range information. FMCW radar improves upon this by sweeping the transmitter frequency periodically to allow a determination of range. Although embodiments of the first aspect of the invention may use any type of radar, the specific example of FMCW will be used herein.

Figure 3:
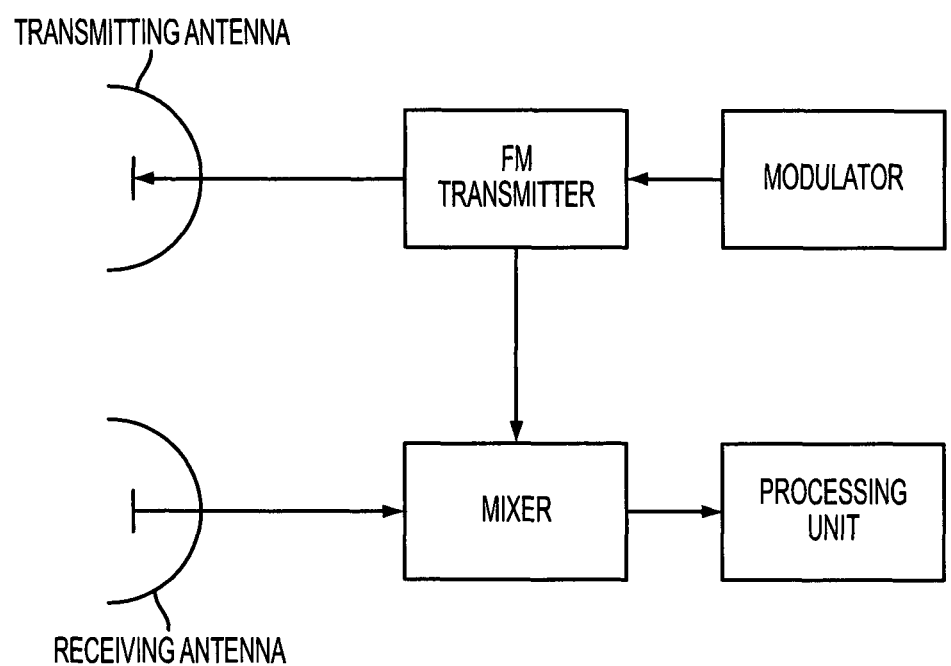
FIG. 3 is a diagram of a vibration detection system incorporating an FMCW radar unit.

FIG. 3 shows a schematic of a vibration detection system incorporating an FMCW radar unit. The FM transmitter provides a radar signal to the transmitting antenna. The signal is a continuous wave of a particular frequency which can be considered a carrier wave that is then modulated by the modulator. The modulation could be amplitude or phase modulation, but the example being used is frequency modulation, whereby the frequency of the carrier CW signal is frequency modulated such that the frequency varies with time.

Three modulation schemes are commonly used: a sinusoidal waveform, a triangular waveform or a saw-tooth waveform.

The modulated radar signal is continuously emitted from the transmitting antenna or emitter. The signal is reflected from the blade as it passes through the field of coverage of the radar and the return signal is detected by the receiving antenna or receiver. A mixer is generally used to combine the received signal with a portion of the originally transmitted signal. The processing unit receives the mixed signal and performs the necessary computation to extract from the received signal a Doppler measurement indicative of the velocity of the rotor blade, giving a speed and a direction either towards the tower or away from the tower.

Figure 4:
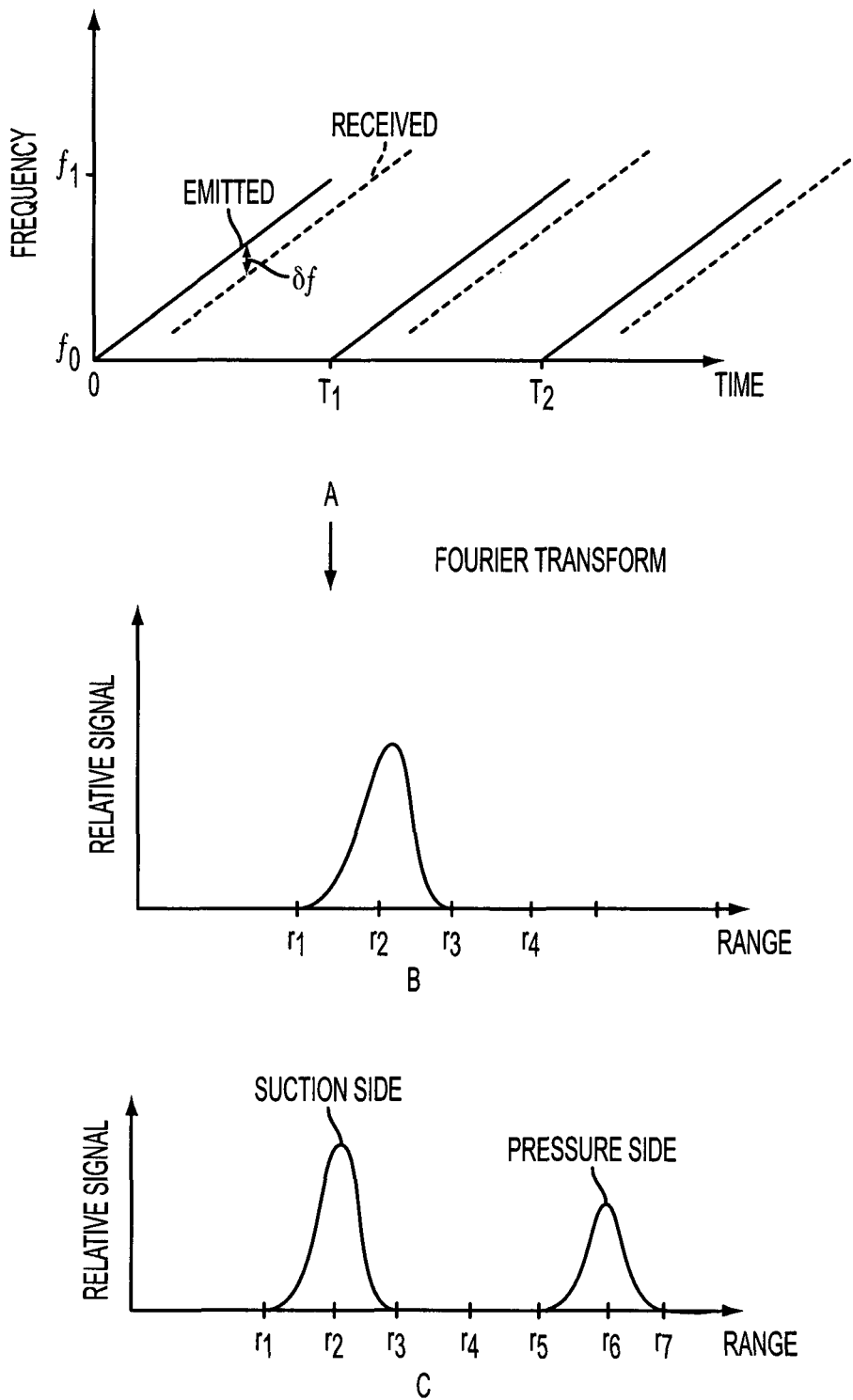
FIG. 4 is a series of diagrams showing various stages in extracting velocity data from received radar data.

FIG. 4 will be used to provide a particular example of the manner in which the Doppler measurement is extracted. It will be appreciated that other computational methods may be possible, or variations on this method may be used.

FIG. 4, drawing A, shows a saw tooth wave CWFM radar signal represented as the solid line. A simplified return signal from the blade is shown by the dotted line. As can be seen from A, the transmitted and received signals are separated, at any given time, by a frequency $\delta f$ which is due to both the range of the blade and the Doppler shift due to the radial velocity of the blade towards or away from the radar unit and therefore also the tower.

The return signal data, which may be mixed with a portion of the emitted signal, is then subjected to a Fourier transform to extract range information. The Fourier transform, sometimes known as a range FFT (Fast Fourier Transform), is applied to each sweep signal to determine a plurality of range profiles, each range profile identifying detected objects within particular range bins or cells. Drawing B of FIG. 4 shows an example range Fourier transform for a particular frequency sweep, having a signal at range bin $r_2$. The peak shown represents a detected blade. A subsequent transform, sometimes known as a Doppler FFT, is then applied to the samples of the same range cell from consecutive frequency sweeps to extract Doppler information indicative of the velocity of the object detected in that range bin. The Doppler information includes the rate of change of phase of the output of each range bin from one sweep to the next, allowing the velocity, including the radial speed and direction towards or away from the turbine tower, to be determined.

Figure 5:
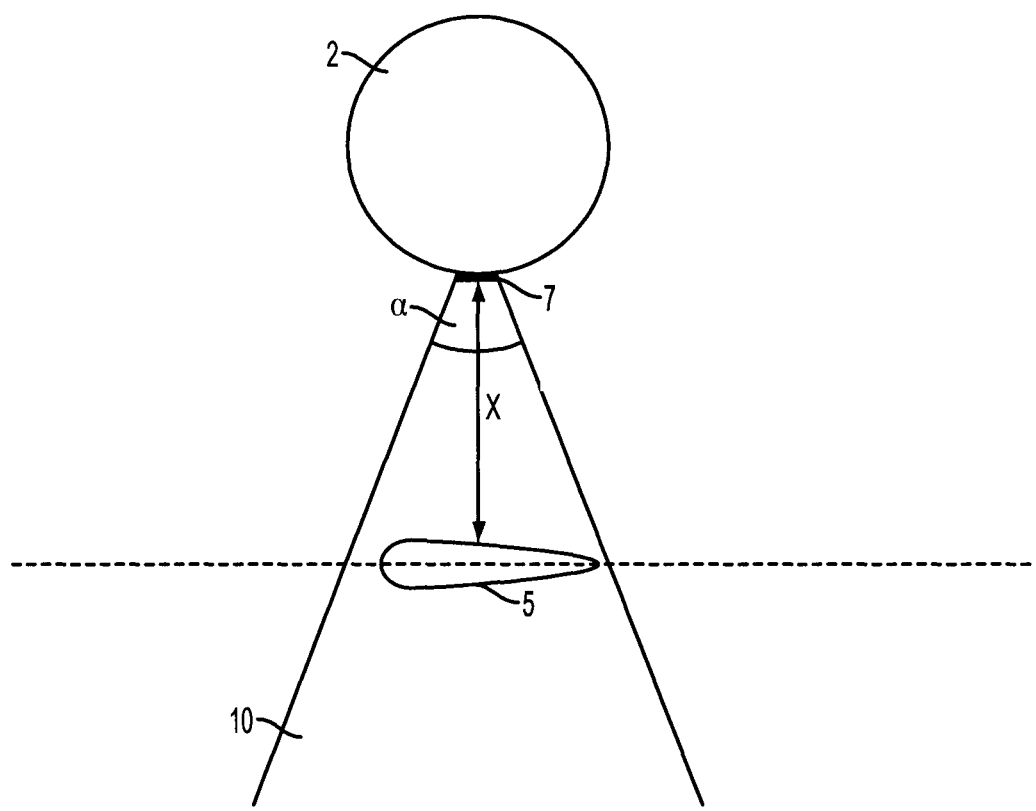
FIG. 5 is a schematic illustration of a cross section through a wind turbine including a radar unit in accordance with an embodiment of the first aspect of the invention.

FIG. 5 is a cross-section of the wind turbine of FIG. 2 along the line A-A, as seen from above, with the rotor blade being at its lowest point rather than in the position shown in FIG. 2. The nacelle is not shown for clarity purposes. The blade passes in front of the tower 2, and therefore also the radar unit 7, at a distance X, being the distance perpendicular to the axis of the tower. The radar unit emits a radar beam 10 having a beam width angle $\alpha$. The amount of time the blade spends within the beam of the radar is dependent upon the value of $\alpha$, X and the speed of rotation of the blade. As mentioned above, typically a blade tip will be located, at the lowest point in the rotation, approximately 3-5 m from the turbine tower. The blade may rotate at a rate of around 20 rpm. A typical example value for $\alpha$ may be 10° or less. Further example values are provided in table 1 below.

TABLE 1

A comparison of example radar parameters for example wind turbine parameters

|  | 77 GHz | 10 GHz |
|---|---|---|
| WT parameters |  |  |
| Rotation rate/blade (rpm) | 20 | 20 |
| Number of blades | 3 | 3 |
| Blade distance (m) from tower | 5 | 5 |
| Blade length (m) | 50 | 50 |
| Blade width (m) | 2 | 2 |
| Rotation rate/blade (deg/s) | 120 | 120 |
| Speed @ blade tip (m/s) | 104.72 | 104.72 |
| Radar parameters |  |  |
| Frequency (GHz) | 77 | 10 |
| Wavelength (m) | 0.0039 | 0.0300 |
| Antenna beamwidth (deg) | 4 | 4 |
| Antenna aperture (effective size) (m) | 0.06 | 0.43 |
| Max observation time/blade (s) | 0.033333 | 0.033333 |
| Sweep bandwidth (GHz) | 20 | 20 |
| Range resolution (m) | 0.0075 | 0.0075 |
| Sweep duration (ms) | 0.1 | 0.1 |
| Unambigious speed (+/−) (m/s) | 9.74 | 75.00 |
| # sweeps during observation time | 333 | 333 |
| Speed resolution (m/s) | 0.12 | 0.90 |

As specified in the table, for a value of X of 5 m, a blade of length 50 m, and a rotation speed of 20 rpm, the tip of the blade is travelling at a rate of approximately 105 m/s and spends a total of around 0.03 seconds within the angular range of the detector per revolution. In order to be able to obtain a reliable measurement of the Doppler value for the blade at least two frequency sweeps will be required, meaning a scan approximately every 0.015 seconds. This is an example of the minimum required number of sweeps. In practice the frequency of the sweeps may be considerably higher, for example a sweep may occur around every 0.1 milliseconds, which provides considerably more than the minimum number of sweeps required for the purposes of blade velocity monitoring.

The range resolution of the radar unit depends upon the frequency sweep bandwidth used. A large bandwidth provides a higher resolution, meaning a greater distance between respective frequency bins in the context of drawing B in FIG. 4. For typical wind turbines the blade may pass around 3-5 m from the turbine tower, and therefore from the radar unit, during the period of measurement. A greater frequency variation over a given time interval provides a more accurate measurement of the transit time and a better indication of range. The Doppler ambiguity, meaning the possibility of an incorrect Doppler measurement, is dependent upon the number of sweeps performed over a given time interval. The more frequency sweeps performed during the observation period, and therefore the shorter the period of each frequency sweep, the more likely the Doppler measurement is to be unambiguous. However, the Doppler resolution, meaning the velocities that can be resolved, depends upon the observation time, regardless of the number of sweeps performed, with a longer observation time providing a higher Doppler resolution. The Doppler resolution is also dependent upon the frequency of the carrier signal of the FMCW, the resolution being higher for higher frequencies. As an example, for the 77 GHz frequency radar it can be seen that a 20 GHz frequency sweep bandwidth gives a range resolution of around 7.5 mm, which is sufficient for resolving the position of the turbine blade. An antenna size of around 6 cm, having a 4° beam width gives a speed resolution of 0.12 m/s, which is also within the desired range for the present purposes. Such an arrangement should allow the unambiguous measurement of vibration speeds in the range +/−9.74 m/s.

It is possible to configure the radar unit to detect radar signals reflected from both the tower side and the opposite side of the blade, with the processing unit being configured to determine the velocity of the tower side (or suction side) and the opposite side (the pressure side) of the blade by identifying signals/reflections received from the respective blade sides. Provided that the bandwidth of the radar unit is sufficient to resolve these two surfaces, a range profile of the sort shown in drawing C of FIG. 4 can be obtained. A range resolution of around 7.5 mm as mentioned above allows the resolution of the two blade sides. The Doppler information for both the range bins corresponding to both surfaces of the blade may then be resolved, giving independent velocity information for both sides of the blade. This can be used to determine if different vibration patterns are occurring on the two sides of the blade, which can indicate structural failure. If the resolution is not sufficient to resolve both sides of the blade then effectively an average Doppler value for both surfaces is determined.

The processing unit may process the range profiles to obtain respective Doppler information for both the tower side and the opposite side of the blade and compare the Doppler information for both blade sides to determine the velocity of each side of the blade in the direction towards or away from the turbine tower. Detecting the velocities of both major surfaces of the blade allows a comparison to be made to determine whether the structure of the blade itself is varying, this being the case if the velocity of one side is different to the velocity of the other.

Referring back to FIG. 2, a single radar unit 7 is fixed to the tower above the lowest point 9 at which the blade 5 passes. In particular, the radar unit may be positioned at a height such that the tip of the blade passes through the field of view of the radar signal such that the velocity of the tip towards or away from the tower is measured. However, the radar unit may be positioned at any height at which it is desired to measure vibrations of the blade.

Although a single radar unit fixed to the tower may be used, it would be preferable to be able to measure blade vibration properties as the turbine moves to different yaw positions. It will be appreciated that if the turbine were to yaw from the position indicated in FIG. 2, or suggested by FIG. 5, the blade's plane of rotation would move from being perpendicular to the direction of emission/detection of the radar unit, resulting in the blade leaving the field of view of the radar unit.

Figure 6:
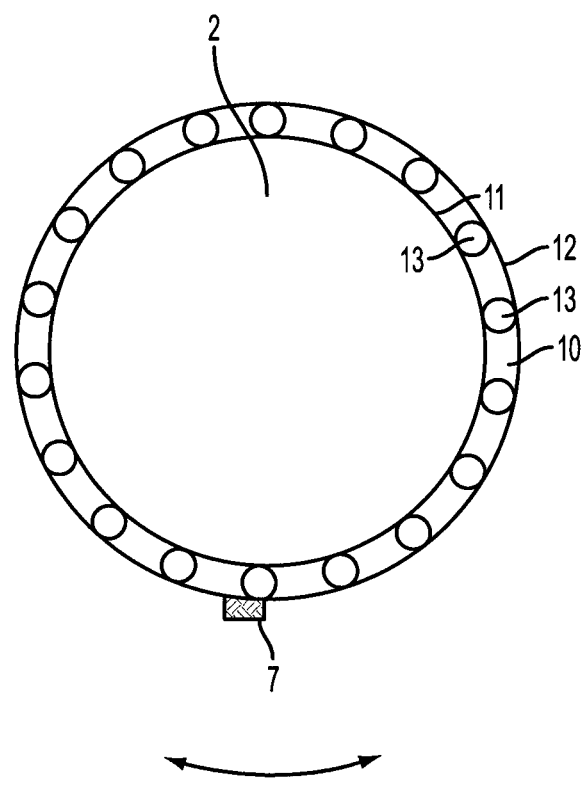
FIG. 6 is a schematic illustration of a cross section through a wind turbine in accordance with a further embodiment of the first aspect of the invention.

FIG. 6 shows an embodiment of the invention that incorporates a moving radar unit. FIG. 6 is taken from the same view as FIG. 5, showing the radar unit 7 fixed to the tower 2 via a rotating mounting 10. The rotating mounting allows the radar unit to rotate about the axis of the tower, around the surface of the tower, at a constant height relative to the base of the tower. The rotating mounting allows the radar unit to rotate in either the clockwise or anti-clockwise directions. The rotational position of the rotational mounting is controlled by an actuator that may receive signals from a control unit. The movement of the radar unit around the tower may be adjusted in response to a change in yaw of the turbine.

Figure 7:
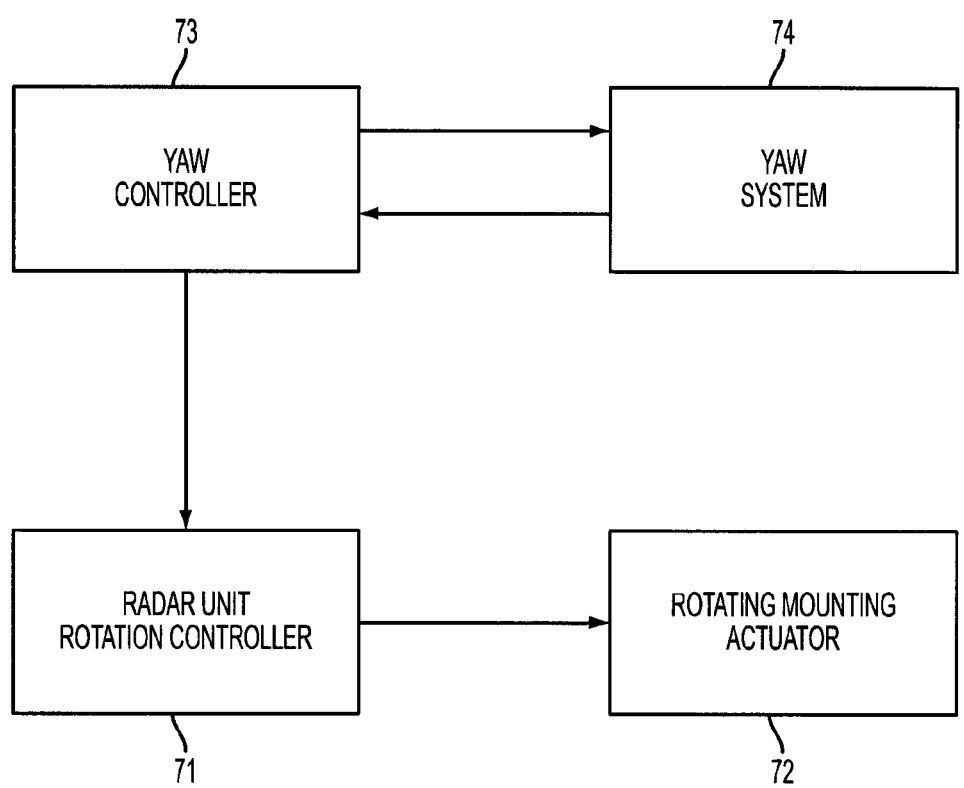
FIG. 7 is a diagram of a control system for a system incorporating a rotating mounting for a radar unit.

FIG. 7 shows an example control system for the rotating mounting. A radar unit rotation controller 71 is provided for sending control signals to the rotating mounting actuator 72. The radar unit rotation controller is coupled to a yaw controller 73 which is configured to send control signals to, and receive yaw data from, a turbine yaw system 74. The yaw controller receives or calculates data indicative of the yaw position of the turbine, and controls the changes to yaw. The radar unit rotation controller is configured to receive yaw positional data and yaw variation data, and to determine whether the rotational position of the radar unit needs to be altered in response. When it is determined that the yaw position of the turbine corresponds to the blades being out of the viewing range of the radar unit when in their lowest position the radar unit rotation controller controls the rotating mounting actuator to rotate the radar unit until it transmits/receives in substantially the same direction as the yaw angle of the turbine. The radar unit rotation controller is preferably part of the radar unit itself.

The rotating mounting actuator itself may be any appropriate construction to allow the required rotation of the radar unit around the circumference of the turbine blade at the required height. This may be in the form of two rings, a first ring 11 being fixed to the turbine tower around its circumference, and a second ring 12 also extending around the turbine tower circumference, to which the radar unit is fixed, the second ring being coupled to the first ring by bearings 13 to allow relative rotation between the two rings and therefore between the radar unit and the turbine tower.

Figure 8:
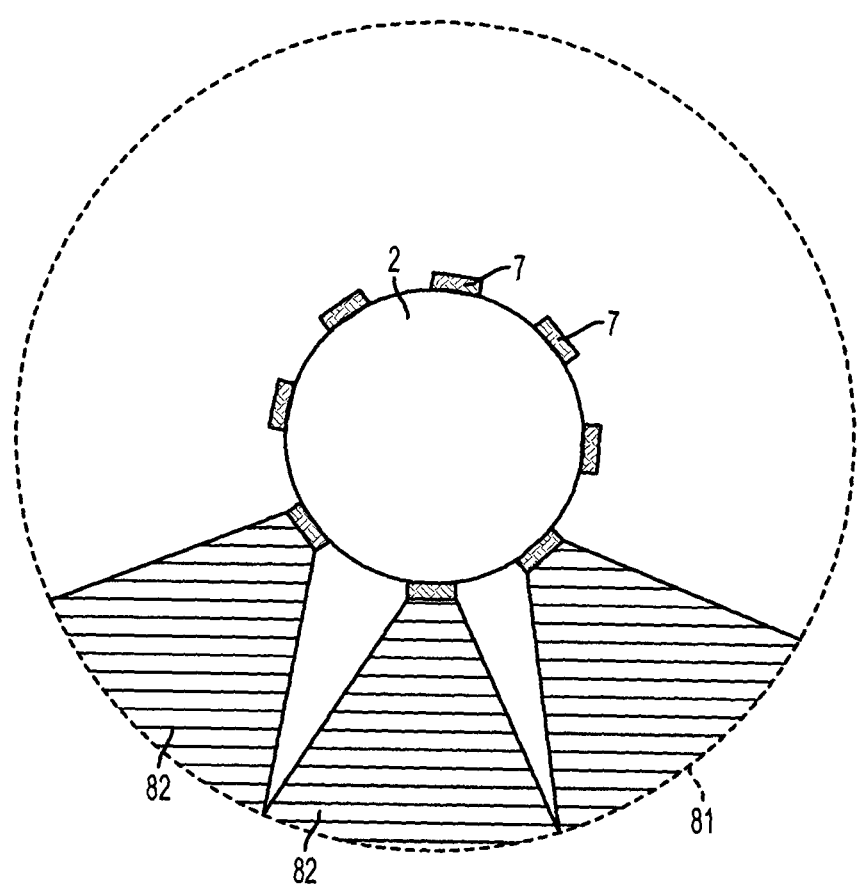
FIG. 8 is a schematic illustration of a cross section through a wind turbine in accordance with a further embodiment of the first aspect of the invention incorporating a plurality of radar units.

An alternative to the arrangement described in relation to FIGS. 6 and 7 is provided in FIG. 8, which is also taken from the same view as FIG. 5. FIG. 8 again shows a turbine tower 2 but in this example a plurality of radar units 7 are fixed around the circumference thereof at a common height. The radar units are distributed at regular intervals. There may be more or fewer units than shown in the Figure. Providing a plurality of units around the circumference has the advantage of requiring no moving parts. Given that low cost units can be used, such as those found in vehicular radar applications such as cruise control applications, the use of a number of units distributed around the turbine tower circumference may be more attractive than having a rotating mechanism.

Circle 81 in FIG. 8 indicates the approximate distance of the turbine blades from the tower, in the plane of the radar unit, where no vibration is occurring for all possible yaw positions. The radar units may be distributed around the tower such that their fields of view overlap at a predetermined horizontal distance from the turbine tower. In particular, the radar units may be distributed such that the horizontal viewing angles cause their fields of view 82 to meet or overlap at a distance from the tower corresponding to the expected position of the blade at the lowest point in its rotation as shown in FIG. 8 for three radar units. The distance at which the fields of view overlap may be at, or at a predetermined distance beyond, the expected distance of the blade when no vibration occurs plus the maximum expected vibration distance, such that the blade can be detected at all yaw positions during all reasonably expected distances caused by vibration.

Figure 9:
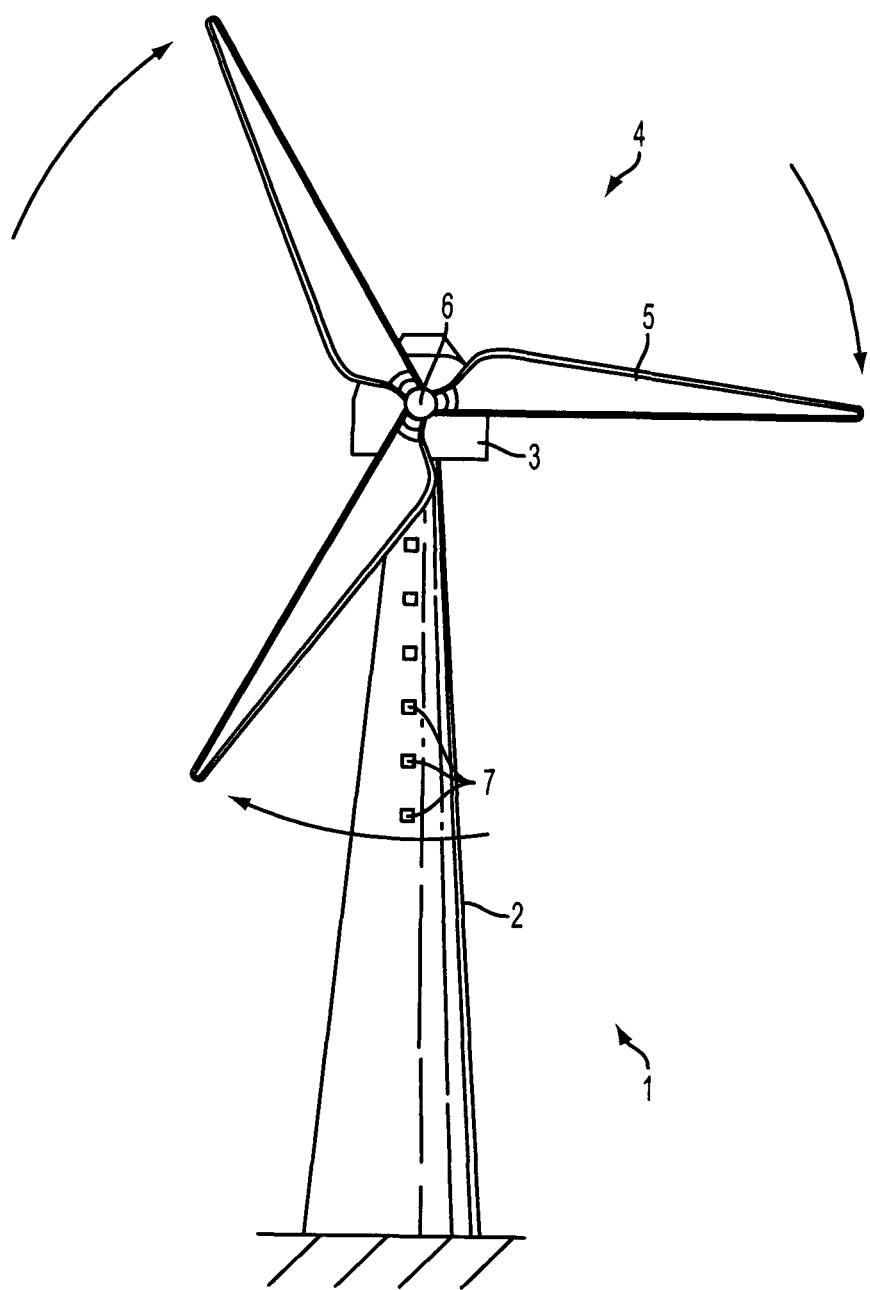
FIG. 9 is a schematic illustration of a wind turbine including a plurality of radar units in accordance with a further embodiment of the first aspect of the invention.

FIG. 9 shows how a plurality of radar units may also be distributed along the height of the wind turbine tower to provide measurements at different heights if required. Each radar unit may be mounted on a rotating mounting such as in the manner described for FIGS. 6 and 7, or alternatively a plurality of radar units may be distributed around the circumference at each height as described for FIG. 8. The heights along the tower may be regular intervals, or they could be points of particular interest such as the midway point of the blade, and/or as close to the blade root as possible.

When using a plurality of radar units such as the example described in relation to FIG. 9 it may be necessary to ensure that respective radar units are sufficiently separated in space, frequency or timing to avoid interference or noise from neighbouring units. In particular, each unit may be configured to transmit, receive or transmit and receive, as is possible with FMCW, at a particular timeslot. The units may therefore be configured to transmit/receive during different respective rotations of the blade/rotor. In the example of a single blade, a first radar unit at a first height along the tower may be configured to send/receive radar signals as the blade passes through its field of view and then cease transmission. A second radar unit at a second height along the tower, different to the first height, may then be configured to begin sending/receiving radar signals, ceasing to transmit once the blade has passed through its field of view. This can be repeated for all radar units distributed at different heights. The coordination of the activation of each radar unit may be performed by a central control unit coupled to each radar unit.

As the radar units establish the velocity of each blade over a period of time a velocity profile can be established, identifying the variation of blade velocity in the direction towards or away from the tower over time. This allows the blade vibration period to be determined. Safety parameters can be introduced, and if the blade vibration period, or the velocity of the blade exceeds a predetermined value then the turbine can be automatically shut down. This can be achieved by the central controller which may be arranged to receive data from each radar unit to determine the velocity profiles for each blade. The central controller may also contain the processing unit configured to receive measurement data from the radar unit such that Doppler shift analysis is performed centrally, remote from the transmitter and receiver. Alternatively the processing unit may be located in a common housing with the transmitter and receiver.

Embodiments have been described of the application of a wind turbine mounted Doppler radar to detect blade velocity towards or away from the tower, and to calculated therefrom the properties of blade vibration out of the plane of rotation such as period of vibration, amplitude of vibration and so on. A turbine mounted Doppler radar may also be used for other applications. One such application is the detection of aircraft as has been described above, and below, in relation to the OCAS system.

In the OCAS system the Doppler radar is preferably an FMCW phased array mounted below the lowest point of the blade on the turbine tower. Example parameters for the OCAS system are a frequency of 1.325 GHz, an antenna beamwidth of around 24° and an antenna aperture effective size of 0.54 m. The sweep bandwidth of 0.035 allows a range resolution of 4.2857 m, an unambiguous Doppler speed of 566.04 m. This allows resolution of aircraft and other objects in the vicinity of a wind turbine. It also allows, using the Doppler measurements of speed described above, the determination of relative movement of parts of the airborne object in relation to its direction of travel. For example, the rotation profile of a helicopter blade can be detected and analysed so that the OCAS system can identify that a detected object is a helicopter. Likewise the propeller of a plane or similar can be identified using the Doppler signature. Furthermore, the measurement of Doppler in this way allows the identification of the Doppler profile of a bird's wing flaps.

Thus the OCAS system, or other types of radar system, can be configured to detect the Doppler signal of moving objects and analyse it to produce a Doppler profile, determining the relative speed of portions of the object that are moving relative to the object's direction of travel. This allows the radar system to identify and classify different targets and adjust the action taken based on these classifications. If an object is determined to be a bird, or flock of birds, then the OCAS system may not activate the warning signals. If the object is determined to be a helicopter then a different warning time, or warning pattern may be used as opposed to an aeroplane.

Embodiments according to a second aspect of the invention will now be described.

A phased array is a directive antenna comprising individual radiating antennae, or elements, which generate a radiation pattern whose shape and direction is determined by the relative phases and amplitudes of the currents at the individual elements. By correctly varying the relative phases it is possible to control the direction of the emitted radiation from the array. The radiating elements might be dipoles, open-ended waveguides, slots cut in waveguide, or any other type of antenna. Phased-array antennae allow the steering of the beam by electronic control.

An array antenna comprises a number of individual radiating elements suitably spaced with respect to one another. The relative amplitude and phase of the signals applied to each element are controlled electronically to obtain the desired radiation pattern from the combined effect of all the elements. Typically, arrays may be linear, comprising a set of elements arranged in a straight line, or planar, comprising a two dimensional configuration of elements.

The maximum radiation emitted may be perpendicular to the line or plane of the array (broadside array), or parallel to the array (endfire array).

Figure 10:
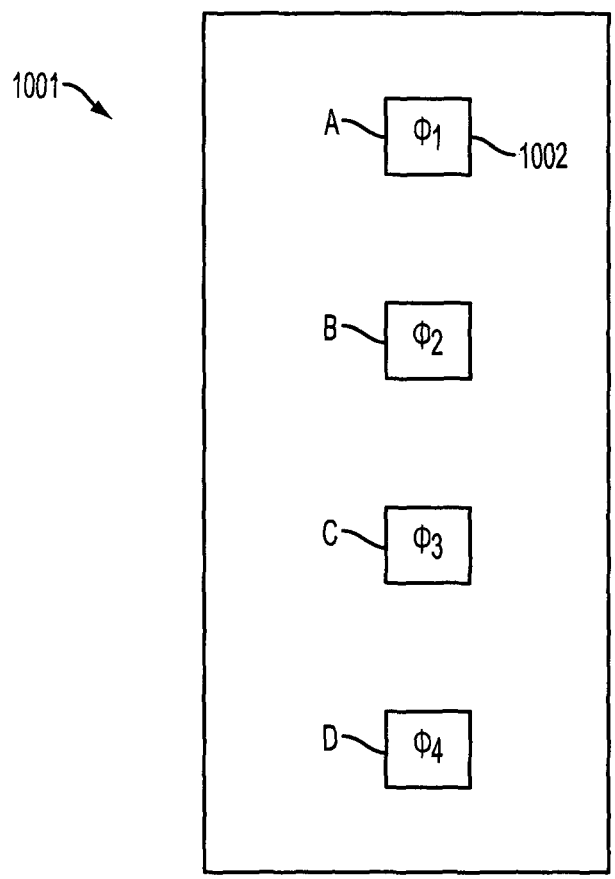
FIG. 10 is a schematic of a linear phased array.

FIG. 10 shows a linear phased-array 1001 comprising a number of elements 1002 in a linear arrangement. The spacing between each element is equal. Each element comprises both an emitter and receiver, such that radiation emitted from the emitter and subsequently reflected by an object within the field of view of the emitter is detected by the receiver. In order to implement such an arrangement, whereby the emitter and receiver are effectively located in the same location, it is preferable that each element operates solely in transmit mode or solely in receive mode at any one time, as simultaneously transmitting and receiving causes interference. In arrangements in which the antenna component functions as both a radiator and receiver, the function being controlled by emitter and receiver electronics, only one of the transmit or receive functions may be used at any one time.

In order to produce a desired radiation pattern, each element of the array has a particular phase of current applied to the emitter. The phase of each element is selected such that the array produces a desired radiation pattern. This is illustrated in FIG. 10, whereby each element has a given phase $\varphi_1$-$\varphi_4$. One or more of these phases may be equal, or they may all be different, but the important factor is their relative values to one another to achieve the desired radiation pattern. Rather than a linear array a two dimensional array, such as a 3 by 4 array of elements may be used for example.

Figure 11:
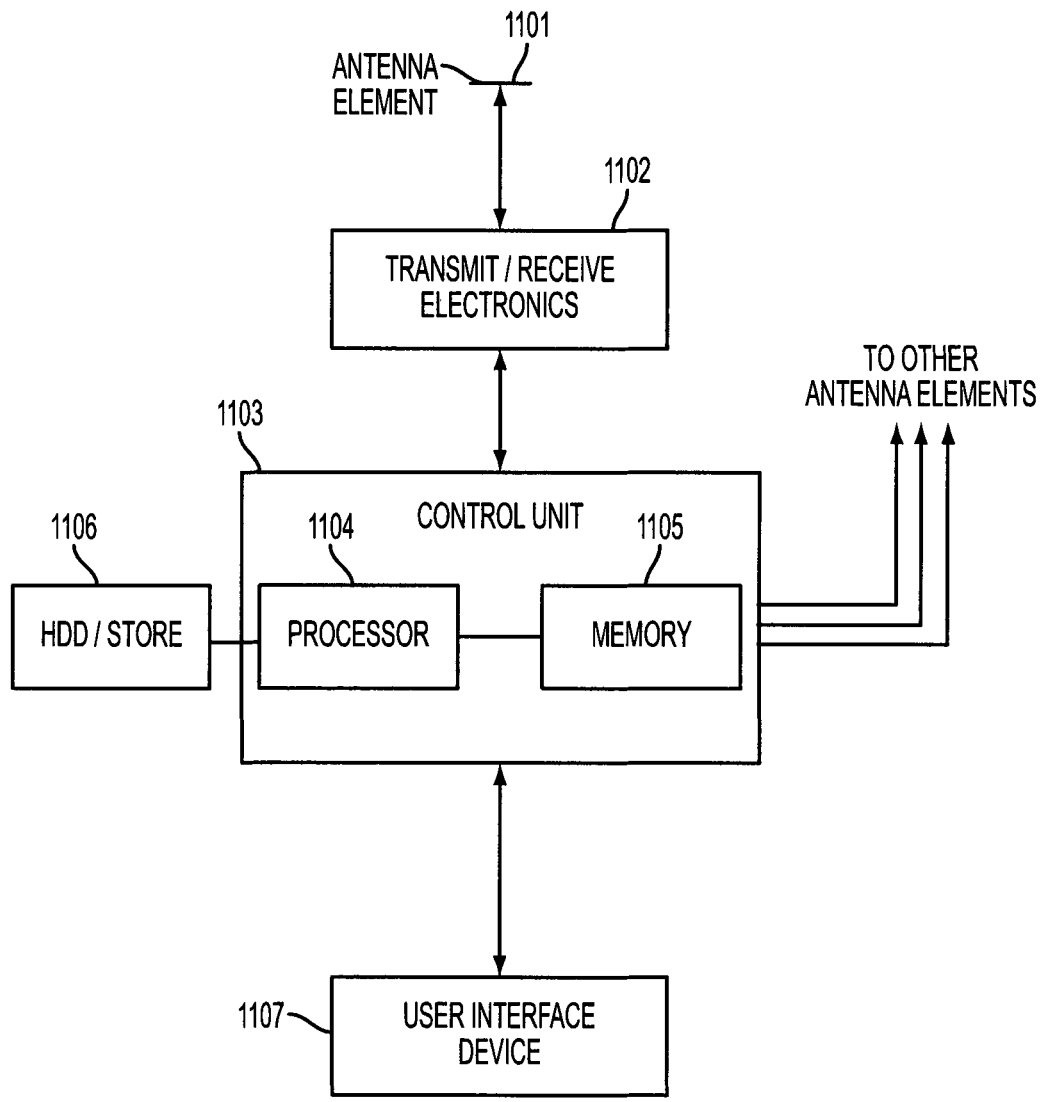
FIG. 11 is a diagram of an antenna element and control unit system.

A control system is illustrated in FIG. 11, which shows a schematic of a portion of the array and control system. An antenna element 1101 is coupled to transmit and receive electronics 1102 configured to operate the antenna element in transmit or receive modes. A control unit 1103 is provided to determine when the antenna element should operate in transmit or receive modes. The control unit comprises a processor, coupled to a memory or RAM 1105 and preferably coupled to a storage device such as a hard disk drive 1106. The control unit is coupled to the other antenna elements in the array, or to their corresponding transmit/receive electronics. The control unit and processor are configured to perform the diagnostic and calibration methods described herein. The control unit is also coupled to a user interface device 1107 for providing data thereto, including warning signals when elements are identified as being faulty, or when the phase or amplitude/gain profile of a given element is determined to be outside desired operating parameters.

Typically, the array will be calibrated at the point of construction to ensure the correct phase relationships between elements. However, the relative phase relations between elements are sensitive to drift over time due to conditions during use, such as temperature, humidity and so on. Since the relative phase between elements defines the beam direction, it is important to be able to ensure that these values are correct or within a desired tolerance. The amplitude or gain factor applied by each receiver is also an important factor. Further, it is also desirable to be able to check whether each element is actually working, since an array can contain many elements and checking them all individually can be laborious.

General calibration, diagnostic or maintenance methods will be described. The general principle employed by embodiments of the second aspect of the invention is to use the leakage channel from one element to transmit radiation into the leakage channel of other elements of the array. Usually it is desirable to minimise any leakage between elements within an array, but as will be seen this side effect can be put to advantageous use. Side lobe radiation emitted by an emitting element may be detected by the receiving antenna through a side lobe. Side lobes can be considered to be the local maxima of the far field radiation pattern of an antenna other than the main lobe. Most antennas have radiation, or conversely receiving, patterns having a number of these lobes at various angles in directions where the radiated, or detected, signal strength reaches a maximum and other angles at which the radiated, or detected, signal strength falls to zero. The power density in the side lobes is generally considerably lower than that in the main lobe. The main lobe and side lobes occur for both transmit and receive modes.

Figure 12:
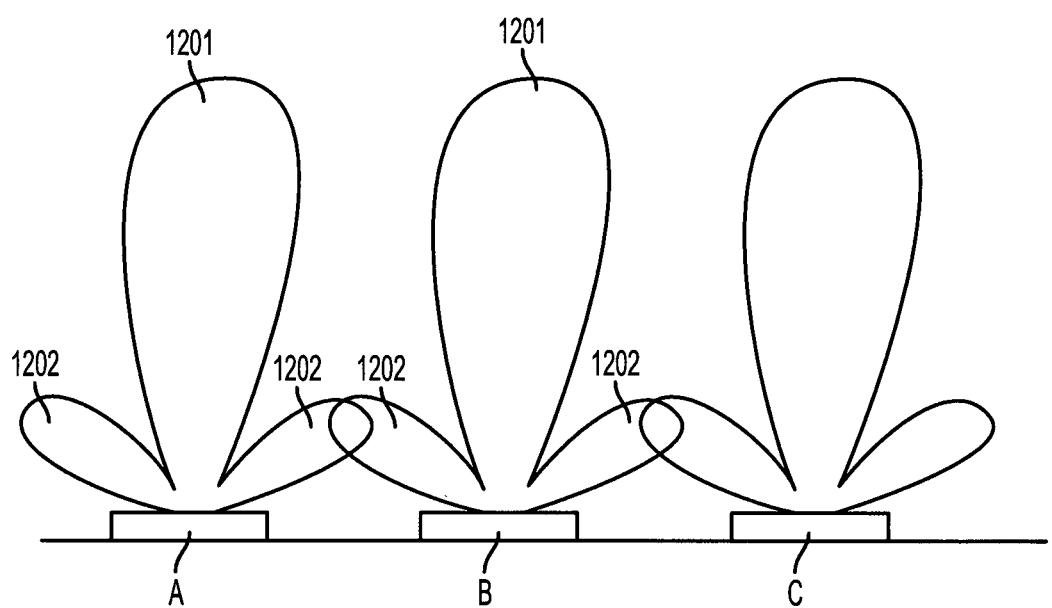
FIG. 12 is a diagram of an example radiation pattern from a radar element.

FIG. 12 highlights how overlap in side lobes may occur for an array of the sort shown in FIG. 10, with FIG. 12 showing a side view of the array including an example emission/detection pattern for each element. Because the elements are identical, the emission/detection patterns are also equivalent. As shown in FIG. 12, transmitting element B radiates generally in the direction perpendicular to the plane of the element via main lobe 1201. In addition, a certain amount of radiation escapes through side lobe 1202. Neighbouring elements A and C are positioned such that their main lobes do not interact with the main lobe of element B to avoid interference. However, there is overlap between the side lobe of element B and the corresponding side lobe of elements A and C. FIG. 12 is a simplified illustration, and more side lobes may be present, some or all of which are used as a leakage channel between elements.

Embodiments of the second aspect of the invention provide a simple way of determining whether elements of an array are functioning. A first element is put into transmit mode. A second element, proximate to the first element, is put into receive mode. The second element is selected relative to the first element such that there exists a leakage channel between the two elements. If a signal is received then it can be established that the first element is operable to transmit and the second element is operable to receive, in which case the transmitting and receiving roles may then be reversed to check the corresponding functions in the elements. In the example of FIG. 10, this could involve using element A as a transmitter, and element B as a receiver, and then vice versa. This process can be repeated for all elements, each time selecting a transmit element and a proximate receive element. The term "proximate" is intended to refer to the fact that the receiving elements are within range of a leakage channel/side lobe of the transmitting element.

If no signal is received at the second element then it can be established that either the emitting element, the receiving element, or both, are faulty. In this event an alert message may be sent, by a control unit coupled to the radar array, to the operator to investigate further. However, it is possible to further narrow down which particular element or elements is/are faulty by performing further comparisons. These further comparisons require the iterative process of successive activation of neighbouring or proximate elements into either transmit or receive mode to establish which elements are functioning and which are not.

As an example, in the event that no signal is received in the above scenario, the method may include selecting a different receiver element, or different transmitter element, to establish whether one or both of the elements are non-functional. If switching the receiver element to a third element results in a signal being detected at the third element then it is established that the second element was faulty, and this information is relayed in the alert message to the operator. If switching the receiver element to a third element results in no signal being detected then a further change is made to select a fourth element, proximate to the third element, to put into transmit mode. If a signal is then received by the third element, this indicates that the first element, the original transmitting element, was faulty. If no signal is received then further investigation is required. It will be appreciated that rather than switching the receiver element to a third element, the transmitter element may instead be switched to a third element.

Using this type of iterative approach of selectively altering one of a pair of elements at a time it is possible to establish, for each element, whether it is operable to transmit and receive.

As mentioned above, the relative phase relationships between each element of the array in FIG. 10 is known from factory measurements, or from theoretical specifications. In order to determine the phase relationship between patches, selected elements of the array are put into transmit and receive mode. In a simple example, a first element B is put into transmit mode, and neighbouring elements A and C, both located proximate to element B are put into receive mode. The phase of the radar signal received by elements A and C are compared, by a processing unit preferably located in the control unit, which can be achieved by comparing or summing the output signal of element A with the output signal from element C to determining the phase difference. If the phase difference between the two elements does not equal the desired phase difference, or is not within the desired tolerance, then calibration is required. The process above can then be repeated as many times as required until the relative phases of each pair of elements has been compared with that of at least one other element.

Once the processing unit has established the relative frequencies between all possible neighbouring pairs, in the case of FIG. 10 this being pairs A/C and B/D, a relative phase profile can be generated, identifying the relative difference in phase of each tested pair of elements, and calibration can be performed on the necessary elements to arrive at the correct phase relationships.

The phases of proximate elements separated from the radiating element by one or more elements can also be performed if they are located close enough to one another for the signal from the transmitting element to reach the signal of the receiving element. Therefore, in a non-symmetric example. the relative phases of elements A and D can be obtained by switching element B to transmit, followed by switching element C to transmit. This then allows a relative phase between A and D to be calculated, and therefore also A and B.

It is preferable that the method be performed by putting one element into transmit mode, and at least two neighbouring elements into receive mode. The receiving elements are in geometrically related positions compared to the transmitting element. Preferably the receiving elements have similar or equivalent geometrical leakage channels in receive mode to one another. This could be described as the receiving elements being equidistant from the radiating element and both located in a position that would, for an expected or predicted radiation pattern, receive an equivalent signal therefrom. Since there is typically symmetry of the radiating pattern around the axis extending vertically from the plane of the element, the positioning of receiving elements in equivalent geometrical leakage channels could be achieved by ensuring there is symmetry in the positioning of the receiving elements about an axis passing through the transmitting element, the axis being in the plane of the panel in which the element is located, and the elements also being equidistant to the emitting element. As described above and below, however, non-symmetrical arrangements also have their uses.

The array only requires relative phase relations to operate, not absolute values. The same is true for amplitude or gain relations. However it is desirable to find the minimum phase and maximum amplitude value set that fulfill the relative requirements. Calibration values from manufacturing tests may also useful as a reference to verify the antenna function.

The measurement method preferably involves measuring the relative phase of the side lobe radar signal of the transmitting element as received at the two receivers. The output of the two receiver elements will be at a maximum when they are in phase and a minimum when they are at opposite phase. This is true even if the amplitude of each receiver element is not equal. Using one transmitter and two receiver elements, the transmitter signal is split to the two receivers as it transmits over the air. Summing the signals from the two receivers is done in the processing unit coupled to the array. The phase setting of the two receivers can be changed until the sum signal is at maximum or minimum to identify when the receivers are in-phase (0 degrees) or out-of-phase (180 degrees). This can be done for the entire range of phase settings to also verify if there are non-linearities in the phase control between the two elements under test. It is also possible to change the amplitude of the transmitter to verify if there are non-linearities in the amplitude vs phase relation between the two receivers. The single element used for transmit, or in other embodiments receive, can be set at any amplitude or phase since the same signal is split or combined from the two elements under test.

In the same way the processor or control unit coupled to the array can change the gain setting of the two receivers and find the point at which the signal strength from both elements are equal. If the reference signal level is 1.0 then a variation of one gain factor by 10% should give a 5% change in the sum for equal gain settings for example. If the gain between elements is unequal, the 10% change in gain of one element will give a different result. If one has 1.1 gain factor and the other 0.9, for example, the change would no longer be exactly 5% but a greater or lesser value depending on which one of the elements, i.e. the element with which gain factor, one change by 10%.

The gain and phase settings in the elements may be controlled by the control unit. This can be used to automatically compensate for measurements of relative phase or gain that indicate that these values are outside a desired tolerance. The gain and phase settings in the elements may be digitally controlled, such that the actual settings have a limited resolution (e.g. 8 bits), meaning that the change applied to the gain and phase factors would be in a number of digital steps up or down.

Although described herein are methods that use one transmitter and two or more receivers, it is possible to do the opposite, using two (or more) transmitters and one receiver, due to the equivalence of a transmitting and receiving antenna. In contrast to the methods using multiple receivers, the summing of signals would occur during transmission over the air. The phase and amplitude measurements are then performed in the same way described above, except the phase and amplitude/gain relations are found for elements in transmit mode.

Figure 13:
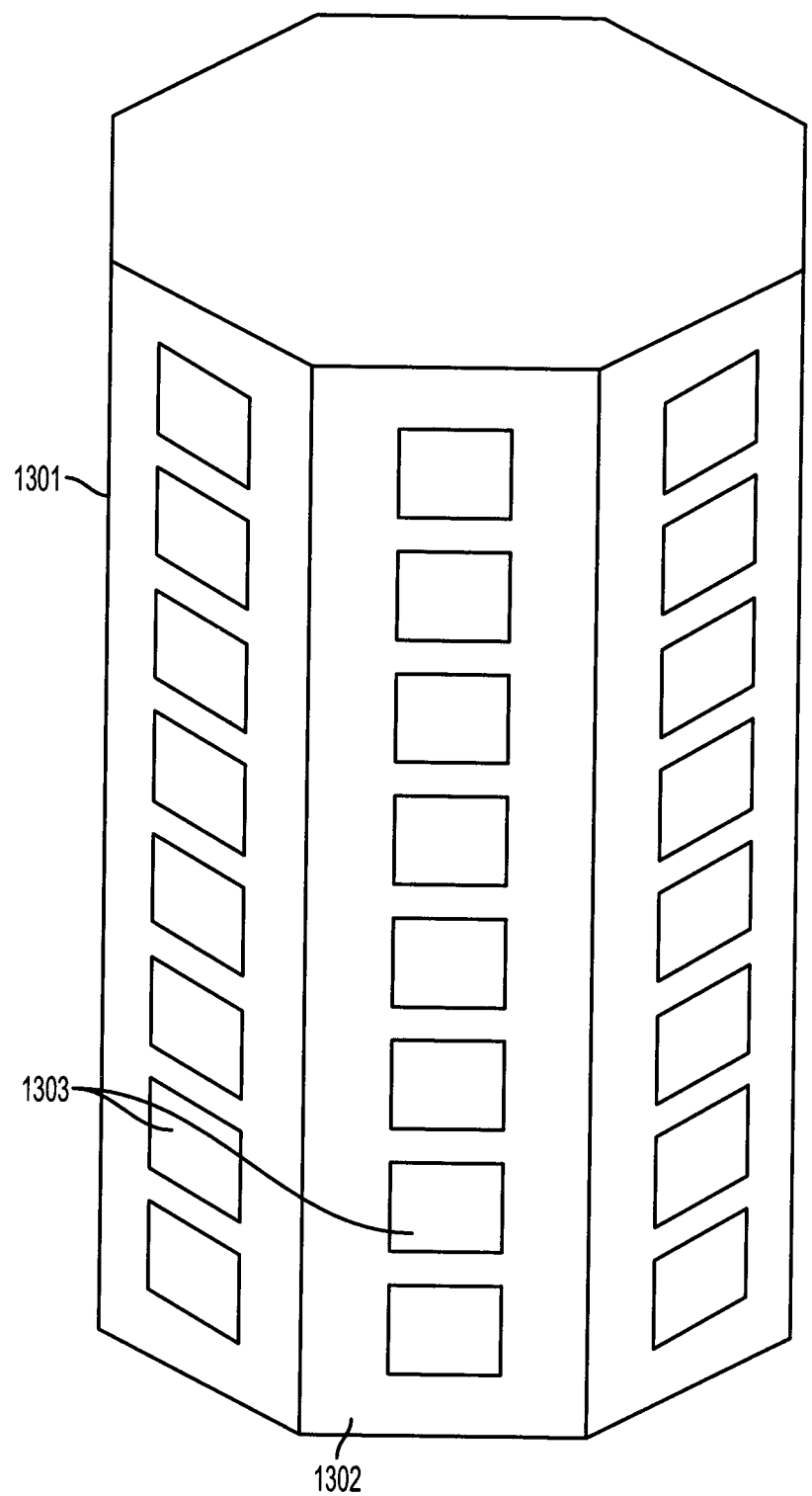
FIG. 13 is a diagram of an antenna array used to implement embodiments of the second aspect of the invention.

Embodiments of the invention find particular use in collision avoidance systems of the sort described above. FIG. 13 shows an example arrangement for a phased array antenna used in such a collision avoidance system, as can be found in EP-A-1,486,798. The array 1301 comprises a number of linear arrays comprising radar elements 1303 formed on panels 1302 combined to form an array that can provide 360° radar coverage. The linear array forms a column along the length of the panel; the elements form rows with the elements of neighbouring panels, the rows extending around the circumference of the entire array. In the arrangement of FIG. 13 there are eight panels together forming an octagonal arrangement, but more or fewer panels may be used. Each panel features a plurality of elements, of the sort described above, that can be put into transmit or receive mode as required. In the arrangement of FIG. 13 there are eight elements; an odd or even number of elements may be used. Preferably the array is a frequency modulated continuous wave (FMCW) type radar, with each element having an antenna coupled to receive and transmit electronics and to a control unit as described in relation to FIG. 11. The FMCW radar is preferably an interrupted version of FMCW which transmits 50% of the time and receives 50% of the time.

The manner in which tests are performed for such an arrangement, including an example of the possible arrangement of leakage channels used, will now be described. It will be appreciated that these tests may not be limited to the octagonal arrangement described, and may apply to any arrangement comprised of a plurality of panels. It will also be appreciated that the combinations of elements used in the testing patterns is an example, and that other combinations of testing patterns may be used.

Figure 14:
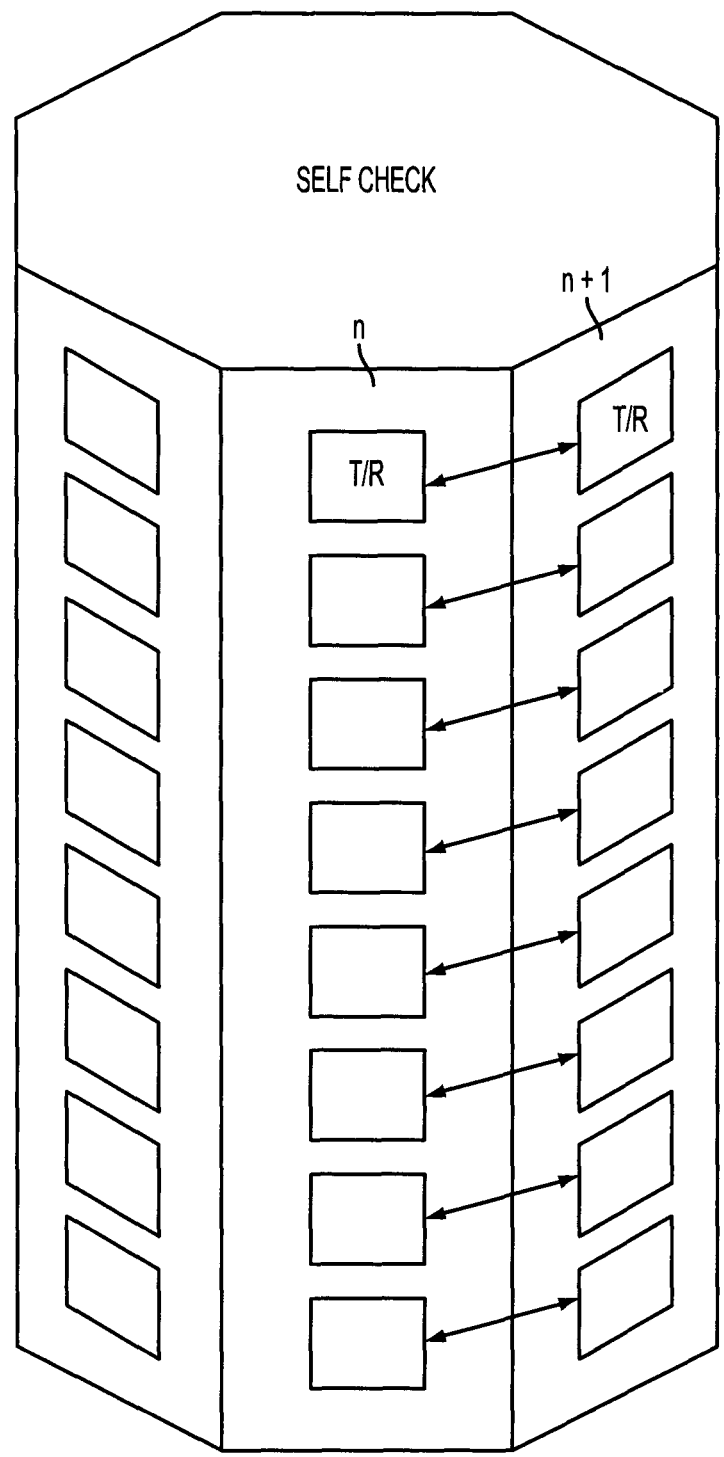
FIG. 14 is a diagram showing example testing patterns.

FIG. 14 shows an initial check performed to determine whether given elements within a panel are functioning. This test can be considered a 1:1 test of horizontal pairs within the same row of the array. As can be seen, each element on a given panel is tested by turning the element to transmit mode, and the corresponding element on the neighbouring panel to receive and vice versa. This can be performed for each element on each panel. In the same manner described above for a linear array, if it is found that an element turned to receive mode is not receiving a signal, other combinations of receiving/transmitting elements can be selected to determine whether there is a fault in the transmitting element, the receiving element, or both. The self check may be performed with horizontal neighbours and may only require the determination of a received signal from a transmitting neighbour, or may compare amplitude and phase values to stored reference values.

Once the self check between the elements of a panel n, and a neighbouring panel n+1, are performed the method can proceed to the calibration portion. The calibration portion consists of comparing the relative phases of the elements in a panel by putting two or more elements into receiver mode and comparing the signal detected from a transmitting element in a similar manner to that described above.

Figure 15:
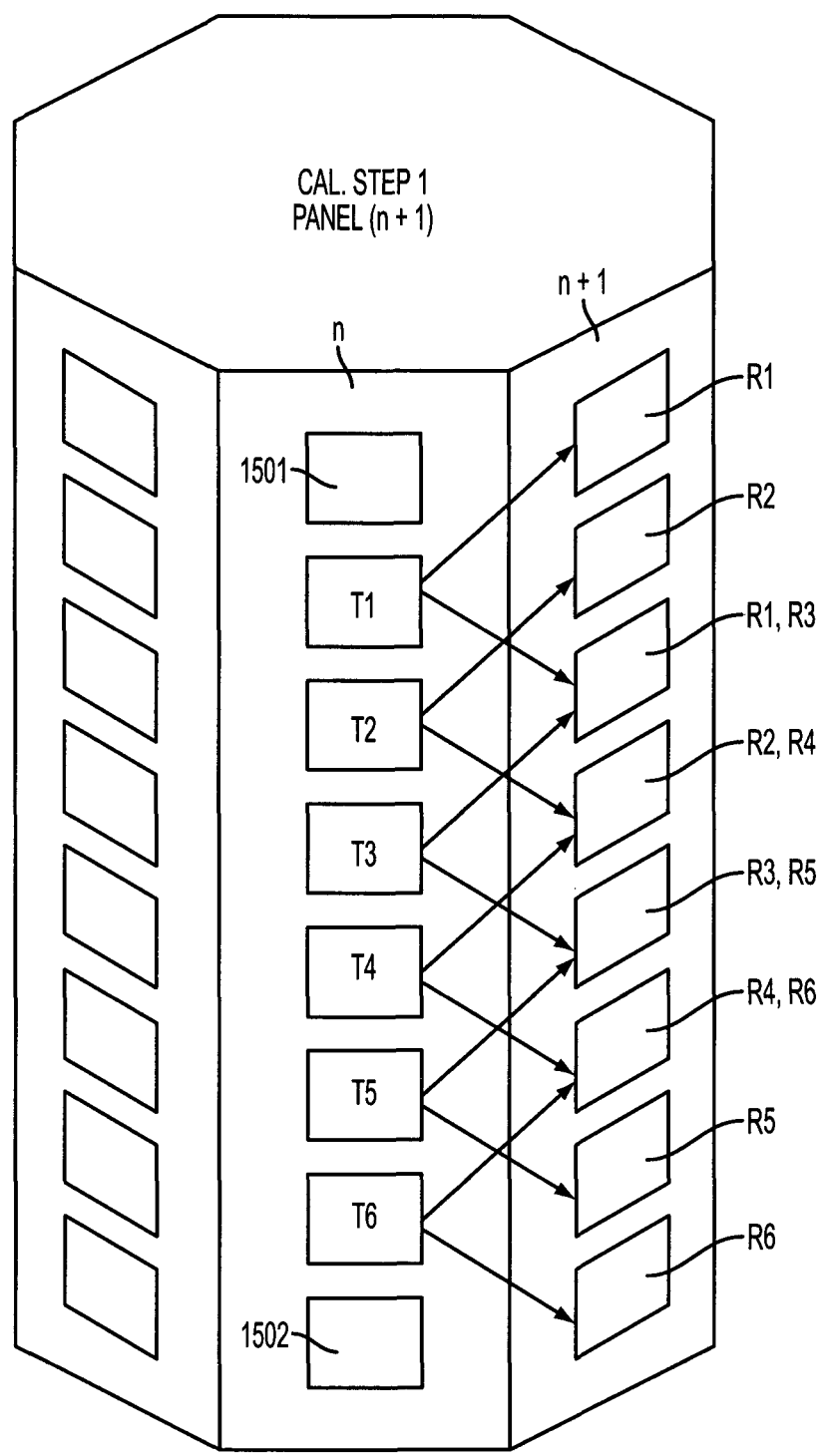
FIG. 15 is another diagram showing example testing patterns.

FIG. 15 shows a first panel calibration step in which the elements on a panel n+1 are compared with next but one neighbours on the same panel by setting a first element and a second element (both designated R1) on a particular panel into receive mode, the first and second elements being separated by an intermediate element on said panel. This can be considered a 1:2 test of 1 step separated symmetrical pairs. An element (T1) on an adjacent panel n is set to transmit mode, the element being located diagonally in the array from the first and second elements, being located in the same row as the intermediate element. Once this check has been performed, the pattern can be repeated by moving it down the panel by one set of elements. The next pair of elements (R2) are switched to receive mode, with the subsequent element (T2) on the panel n set to transmit mode. This can be repeated until all elements on the panel n+1 have been compared with at least one further element on that panel.

It has been observed that the leakage channels are quite different for the elements at the upper and lower edges of the panel, such as elements 1501 and 1502, compared to the middle elements. This is why the diagonal solutions are used, for which the leakage channels are less dependent on whether the receiver element is at the upper or lower edges of a panel.

Figure 16:
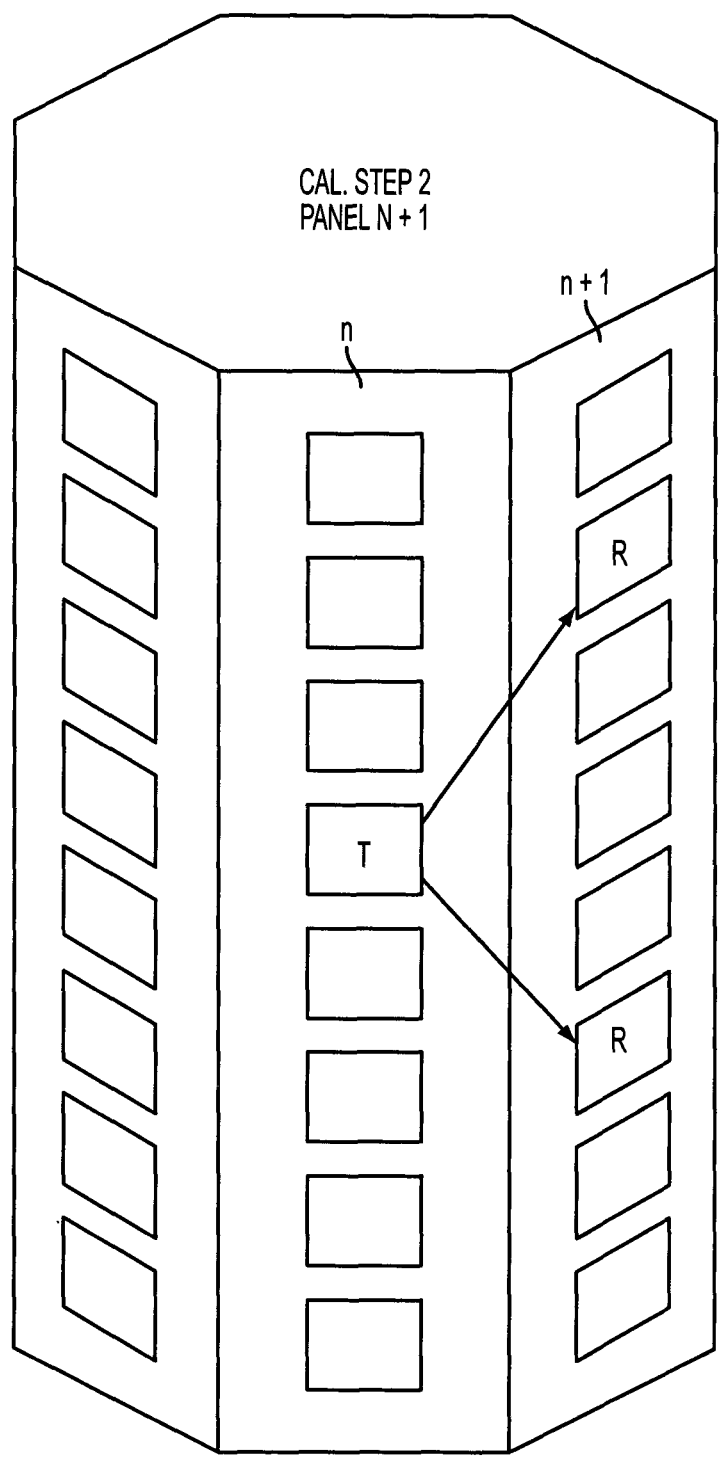
FIG. 16 is another diagram showing example testing patterns.

A second step of panel calibration is shown in FIG. 16. Again, elements on a panel n+1 are compared with neighbours, but here the neighbours are separated by more than one intermediate element. In particular, to retain symmetry, the receiver elements are separated, on the panel, by three intermediate elements. This can be considered a 1:2 test of diagonal two step separated pairs. The transmit element on the adjacent panel n is located in the same row of the array as the central intermediate element, being equidistant from both receiving elements. This extended diagonal leakage channel provides a further calibration check, and can be repeated such that each element on the n+1 panel is compared with at least one other element, receiving the signal from a transmitting element located two rows apart.

Figure 17:
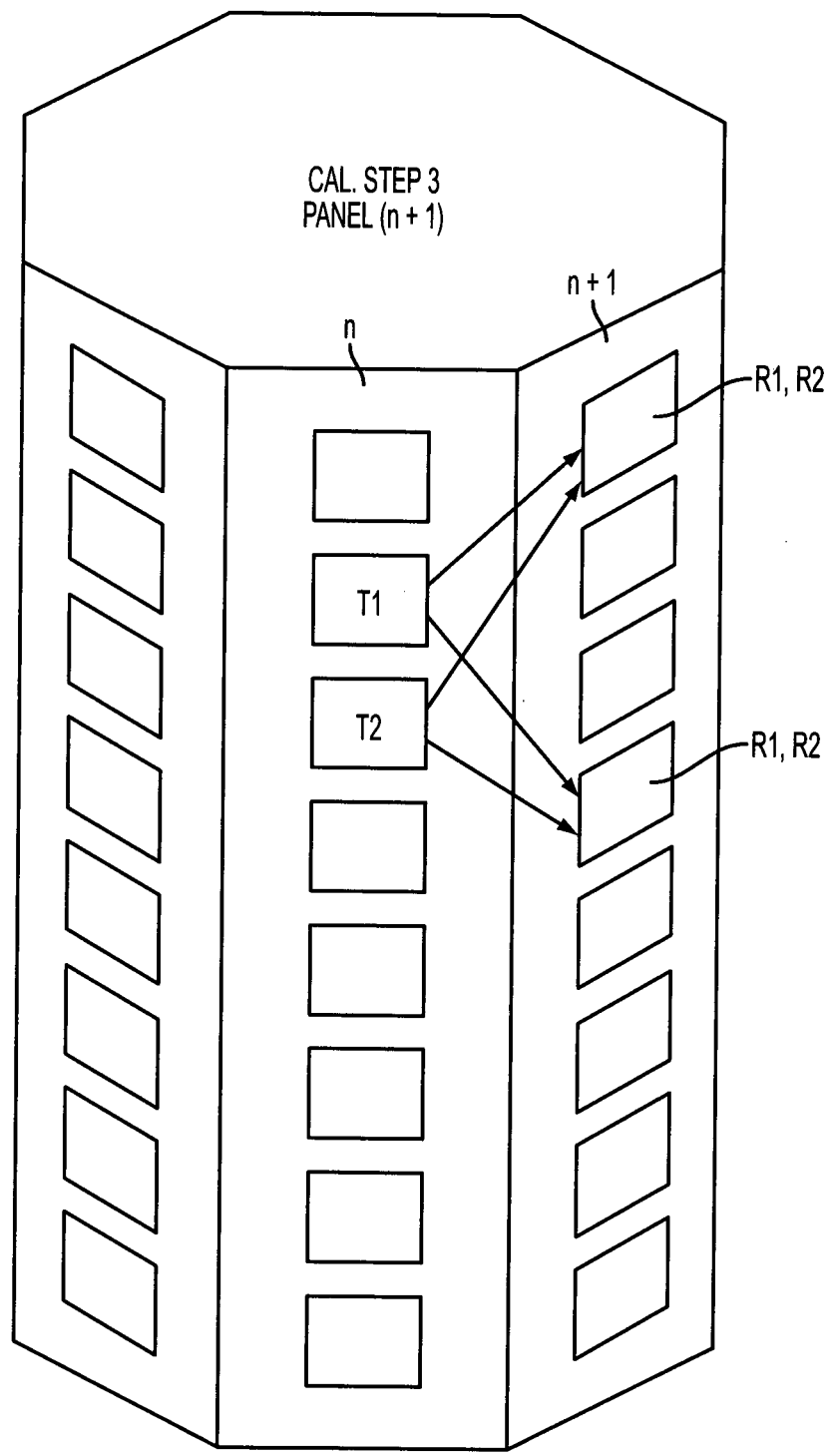
FIG. 17 is another diagram showing example testing patterns.

A third step of panel calibration is shown in FIG. 17. This step provides, in contrast to the other steps discussed, a non-symmetrical check whereby the receiving elements to be compared are separated by two intermediate elements, with the transmitting element being located closer to one receiving element than the other. This can be considered a 1:2 asymmetrical test of diagonal one and two step separated pairs, being a combination of the first and second steps of panel calibration mentioned above. The transmitting element, again being located on an adjacent panel to the two receiving elements, is located one row from one of the receiving elements and two rows from the other receiving element. Again, this non-symmetrical calibration can be repeated such that each element on the n+1 panel is compared with at least one other element. Unlike the first and second steps at least two separate comparisons are required using different transmit elements for the same pair of receiver elements (here T1 and T2 are used) to provide at least two sets of results. This is required due to the lower accuracy caused by the use of asymmetrical leakage channels.

The three panel calibration steps provide comparisons for calibration of panels. The known relation between the first step and the second step diagonal leakage channels, using the relation established by the non-symmetrical test in step three, allows a connection to be made for the relations between the odd and pair-numbered elements.

Figure 18:
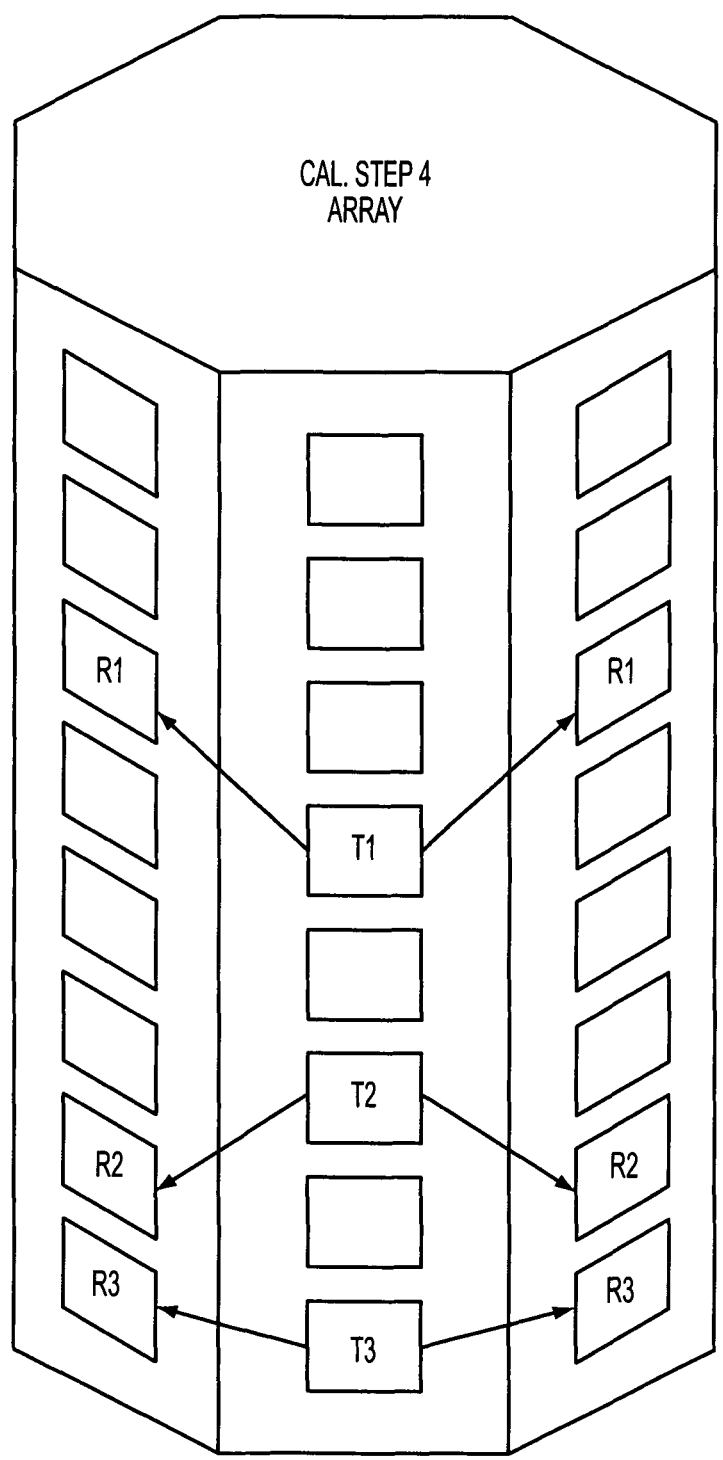
FIG. 18 is another diagram showing example testing patterns.

A fourth calibration step is shown in FIG. 18, this being an array calibration as it allows the calibration of multiple panels, rather than an internal panel calibration. To calibrate the array (the relations between the vertical modules or panels), some diagonal or horizontal patterns are shown. In this calibration at least two elements from two panels separated by an intermediate panel are compared; that is an element on one panel is compared with an element on another panel, the two panels being separated by an intermediate panel. In this case, an element from the n+1 panel is compared against an element from the n−1 panel using a transmit element from the n panel. The two receive elements are symmetrically distributed about the transmit panel such that they are in equivalent geometrical leakage channels.

The positioning of receiving elements in equivalent geometrical leakage channels can again be achieved by ensuring there is symmetry in the positioning of the receiving elements about an axis passing through the transmitting element, the axis being in the plane of the panel in which the element is located, and the elements also being equidistant to the emitting element.

A number of possible relationships between the receive and transmit elements may be used, as shown in FIG. 18. This may include the receive and transmit elements being located in a common row, being adjacent to one another. Alternatively a one step diagonal arrangement or two step diagonal arrangement may be used. Some form of averaging is preferred to set the phase and amplitude relations between neighbour panels and for the entire array.

Although the various calibration steps have been described in a particular preferred order, any step of the calibration methods described may be performed in any order, and in any combination with some, all or none of the above described steps. Other steps involving different combinations of transmit and receive elements may also be used.

As a number of calibrations are performed, a relative phase and amplitude/gain profile, containing the relative phases and gain values between all tested sets of elements can be established. This set of values, which may include factory measured or theoretically expected values, may be used in future calibrations and to control or adjust the phase and/or gain values of each element to ensure they are within acceptable parameters for obtaining the desired beam profile and direction. The phase and amplitude profiles may be stored in the store/memory 1106 coupled to the control unit.

What is claimed is:

1. A wind turbine comprising a wind turbine tower and at least one rotor blade of a rotor and a system for measuring rotor blade vibration in said wind turbine, the system comprising:
   at least one Doppler radar unit, operatively configured to emit and receive radar signals, mounted on the wind turbine tower at a position above a lowest position of the rotor blade, the radar unit being positioned so as to measure reflections of an emitted radar signal from the rotor blade; and
   a processing unit configured to receive measurement data from the radar unit and to determine, by analysis of Doppler shift in received radar signals relative to the emitted radar signals due to movement of the rotor blade towards or away from the wind turbine tower, a velocity of the rotor blade in a direction towards or away from the wind turbine tower, wherein the processing unit is further configured to calculate properties of rotor blade vibration based on the determined velocity, wherein the properties of rotor blade vibration comprise: period of vibration of the rotor blade and amplitude of vibration of the rotor blade.

2. The wind turbine according to claim 1 wherein the radar unit is a frequency modulated continuous wave (FMCW) radar unit, and wherein the radar unit is configured to have a frequency modulation period such that the rotor blade passing through a radar beam generated by the radar unit is within said radar beam for a duration of at least two frequency modulation periods.

3. The wind turbine according to claim 2 wherein the frequency modulation period is between 0.2 and 0.05 milliseconds.

4. The wind turbine according to claim 2 wherein the processing unit is configured to process the measurement data from the radar unit obtained during a first frequency modulation period and a subsequent frequency modulation period to determine the Doppler shift.

5. The wind turbine according to claim 4 wherein the radar unit measures, or the processing unit determines, frequency responses from the received radar signals, and wherein the processing unit is configured to:
   process the frequency responses obtained for the first and subsequent frequency modulation periods to determine respective range profiles indicative of respective ranges from the radar unit to the rotor blade;
   process the range profiles to obtain respective Doppler information;
   compare the Doppler information to determine the velocity of the rotor blade in the direction towards or away from the wind turbine tower.

6. The wind turbine according to claim 5 wherein the range profiles include a plurality of range bins, each corresponding to a set of ranges, the processing unit being configured to process data falling within the range bins corresponding to the position of the rotor blade to obtain respective Doppler information.

7. The wind turbine according to claim 1 wherein the processing unit is configured to determine respective velocities of a tower side and an opposite side of the rotor blade by identifying signals received from the respective blade sides.

8. The wind turbine according to claim 7, wherein the processing unit processes range profiles to obtain respective Doppler information for both the tower side and the opposite side of the rotor blade and compares the Doppler information for both blade sides to determine the respective velocities of the tower side and the opposite side of the rotor blade in the direction towards or away from the wind turbine tower.

9. The wind turbine according to claim 1 wherein the radar unit is mounted in a position such that the emitted radar signals reflect from a blade tip when passing through a lowest point of the rotor blade.

10. The wind turbine according to claim 1 comprising a plurality of Doppler radar units each mounted on the wind turbine tower.

11. The wind turbine according to claim 10 wherein the plurality of Doppler radar units are arranged around a circumference of the wind turbine tower at a common height.

12. The wind turbine according to claim 10 wherein the plurality of Doppler radar units are arranged linearly along a length of the tower between a center of the rotor blade and the lowest position of the rotor blade.

13. The wind turbine according to claim 1 wherein the radar unit is rotatably mounted on the wind turbine tower such that it rotates around an axis of the tower, the radar unit further comprising a rotation controller for controlling a rotational position of the radar unit around the axis of the tower.

14. The wind turbine according to claim 13, the wind turbine having a nacelle to which the at least one rotor blade is coupled, the nacelle having a yaw control system for rotating the nacelle, and the rotor blade, around the axis of the tower to yaw the rotor blade, wherein:
   the rotation controller is coupled to the yaw control system, the rotation controller being operable to receive yaw data indicative of a yaw position of the wind turbine and to control the rotational position of the radar unit to position it to face substantially perpendicular to a plane of rotation of the rotor blade in response to the yaw data.

15. The wind turbine according to claim 1 wherein the processing unit is further configured to issue a shut down signal to shut down the wind turbine when a detected velocity of the rotor blade in the direction towards or away from the turbine tower exceeds a predetermined value.

16. A method for measuring rotor blade vibration in a wind turbine comprising a wind turbine tower and at least one rotor blade, the method comprising:

providing at least one Doppler radar unit operatively configured to emit and receive a radar signal mounted on the wind turbine tower at a position above a lowest position of the rotor blade, the radar unit being positioned so as to measure reflections of an emitted radar signal from the rotor blade;

emitting the radar signal and receiving reflections thereof from the rotor blade;

analyzing Doppler shift of the received radar signals relative to the emitted radar signal to determine a velocity of movement of the rotor blade towards or away from the wind turbine tower; and calculating properties of rotor blade vibration based on the determined velocity, wherein the properties of rotor blade vibration comprise: period of vibration of the rotor blade and amplitude of vibration of the rotor blade.

17. A sub system for use in a wind turbine comprising a wind turbine tower and at least one rotor blade, the sub system comprising:

at least one Doppler radar unit operatively configured to emit and receive a radar signal, being mountable on the wind turbine tower at a position above a lowest position of the rotor blade, the radar unit being positioned so as to measure reflections of an emitted radar signal from the rotor blade; and a processing unit configured to receive measurement data from the radar unit and to determine, by analysis of Doppler shift in received radar signals relative to the emitted radar signals due to movement of the rotor blade towards or away from the wind turbine tower, a velocity of the rotor blade in a direction towards or away from the wind turbine tower, wherein the processing unit is further configured to calculate properties of rotor blade vibration based on the determined velocity, wherein the properties of rotor blade vibration comprise: period of vibration of the rotor blade and amplitude of vibration of the rotor blade.

\* \* \* \* \*